United States Patent
Sugimura

(10) Patent No.: US 9,870,222 B2
(45) Date of Patent: Jan. 16, 2018

(54) AIR-CONDITIONING SYSTEM

(71) Applicant: Mitsubishi Electric Corporation, Tokyo (JP)

(72) Inventor: Mitsuhiro Sugimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/776,762

(22) PCT Filed: May 10, 2013

(86) PCT No.: PCT/JP2013/063197
§ 371 (c)(1),
(2) Date: Sep. 15, 2015

(87) PCT Pub. No.: WO2014/181472
PCT Pub. Date: Nov. 13, 2014

(65) Prior Publication Data
US 2016/0025370 A1    Jan. 28, 2016

(51) Int. Cl.
*G06F 9/44*    (2006.01)
*G06F 9/445*    (2006.01)
(Continued)

(52) U.S. Cl.
CPC .............. *G06F 8/71* (2013.01); *F24F 11/006* (2013.01); *F24F 11/02* (2013.01); *G06F 8/65* (2013.01);
(Continued)

(58) Field of Classification Search
CPC ................................................ G06F 8/60–8/78
See application file for complete search history.

(56) References Cited

U.S. PATENT DOCUMENTS 7,434,089 B2 * 10/2008 Smith ...................... G06F 8/65
714/6.1
7,913,246 B2 * 3/2011 Hammond ................ G06F 8/65
340/538
(Continued)

FOREIGN PATENT DOCUMENTS

JP    11-044450 A    2/1999
JP    2000-031998 A    1/2000
(Continued)

OTHER PUBLICATIONS

Tajika, Yosuke et al. "Networked Home Appliance System using Bluetooth Technology Integrating Appliance Control/Monitoring with Internet Service," 2003, pp. 1043-1048.*

(Continued)

*Primary Examiner* — Thuy Dao
*Assistant Examiner* — Christopher Franco
(74) *Attorney, Agent, or Firm* — Posz Law Group, PLC

(57) ABSTRACT

An air-conditioning system is provided with an air-conditioning apparatus management apparatus and an air-conditioning apparatus which transmits and receives various signals to and from the air-conditioning apparatus management apparatus. The air-conditioning apparatus management apparatus manages the air-conditioning apparatus, an operational state of the air-conditioning apparatus management apparatus is linked to an operational state of the air-conditioning apparatus, and software set in the air-conditioning apparatus management apparatus is updated based on the operational state of the air-conditioning apparatus management apparatus.

7 Claims, 13 Drawing Sheets

(51) Int. Cl.
*F24F 11/00* (2006.01)
*F24F 11/02* (2006.01)

(52) U.S. Cl.
CPC ........ *G06F 8/67* (2013.01); *F24F 2011/0072* (2013.01); *G06F 8/60* (2013.01)

(56) References Cited

U.S. PATENT DOCUMENTS

| | | | | |
|---|---|---|---|---|
| 8,594,850 | B1* | 11/2013 | Gourlay | G06F 8/61 165/11.1 |
| 8,606,765 | B2* | 12/2013 | Boggs | G06F 8/65 707/695 |
| 9,021,462 | B2* | 4/2015 | Gupta | G06F 8/65 717/172 |
| 9,111,098 | B2* | 8/2015 | Smith | G06F 21/00 |
| 2004/0243994 | A1* | 12/2004 | Nasu | G06F 8/65 717/171 |
| 2005/0039471 | A1* | 2/2005 | Smith | G06F 8/65 62/157 |
| 2005/0144616 | A1* | 6/2005 | Hammond | G06F 8/65 717/173 |
| 2009/0144718 | A1* | 6/2009 | Boggs | G06F 8/65 717/170 |
| 2010/0106957 | A1* | 4/2010 | Grohman | G06F 8/665 713/2 |
| 2011/0010720 | A1* | 1/2011 | Smith | G06F 21/00 718/102 |
| 2012/0173857 | A1* | 7/2012 | Kobraei | G06F 8/665 713/2 |
| 2013/0067450 | A1* | 3/2013 | Saugnac | G06F 8/65 717/170 |
| 2014/0096126 | A1* | 4/2014 | Gourlay | G06F 8/61 717/173 |
| 2014/0215450 | A1* | 7/2014 | Salisbury | G06F 8/65 717/170 |
| 2014/0282458 | A1* | 9/2014 | Gupta | G06F 8/65 717/168 |
| 2015/0074658 | A1* | 3/2015 | Gourlay | G06F 8/61 717/172 |

FOREIGN PATENT DOCUMENTS

| | | |
|---|---|---|
| JP | 2000-172508 A | 6/2000 |
| JP | 2006-146404 A | 6/2006 |
| JP | 2006-340060 A | 12/2006 |
| JP | 2007-078221 A | 3/2007 |
| JP | 2008-027149 A | 2/2008 |
| JP | 2008-304144 A | 12/2008 |
| JP | 2009-008341 A | 1/2009 |
| JP | 2009-204185 A | 9/2009 |
| JP | 2010-204830 A | 9/2010 |
| JP | 2010-205152 A | 9/2010 |

OTHER PUBLICATIONS

Nichols, Jeffrey et al., "Studying the Use of Handhelds to Control Smart Appliances," 2003, pp. 1-6.*
Meshkova, Elena et al., "Modeling the Home Environment using Ontology with Applications in Software Configuration Management," 2008, pp. 1-6.*
Papadopoulos, Nektarios et al., "A Connected Home Platform and Development Framework for Smart Home Control Applications," 2009, pp. 402-409.*
Cadar, Cristian et al., "Multi-version Software Updates ," 2012, pp. 36-40.*
Gouin-Vallerand, Charles et al., "Managing and deployment of applications with OSGi in the context of Smart Homes," 2007, pp. 1-8.*
International Search Report of the International Searching Authority dated Aug. 13, 2013 for the corresponding international application No. PCT/JP2013/063197 (and English translation).
Office Action dated Aug. 30, 2016 issued in corresponding JP patent application No. 2015-515759 (and English translation).

* cited by examiner

AIR-CONDITIONING SYSTEM

CROSS REFERENCE TO RELATED APPLICATION

This application is a U.S. national stage application of International Application No. PCT/JP2013/063197 filed on May 10, 2013, the disclosure of which is incorporated herein by reference.

TECHNICAL FIELD

The present invention relates to an air-conditioning system.

BACKGROUND ART

Hitherto, when performing maintenance of software retained in a maintenance target apparatus, an operator goes to a site and performs update of the software, and the like (e.g., see Patent Literature 1).

In addition, hitherto, a server transmits software for update to a maintenance target apparatus, to update software in the maintenance target apparatus (e.g., see Patent Literature 2).

Moreover, hitherto, a receiving side apparatus monitors the version of software transmitted from a transmitting side apparatus, and when the version of the software is the latest version, the receiving side apparatus updates software by downloading the transmitted software (e.g., see Patent Literature 3).

CITATION LIST

Patent Literature

Patent Literature 1: Japanese Unexamined Patent Application Publication No. 2008-27149 (paragraph [0056])
Patent Literature 2: Japanese Unexamined Patent Application Publication No. 2000-172508 (paragraph [0025])
Patent Literature 3: Japanese Unexamined Patent Application Publication No. 2000-31998 (paragraph [0031])

SUMMARY OF INVENTION

Technical Problem

In the related art example described in Patent Literature 1, for example, the operator brings a terminal to the site and directly connects the terminal to each maintenance target apparatus to perform update of software and the like. Thus, an enormous amount of operation time is required at the site.

In the related art example described in Patent Literature 2, since the server performs update of software and the like, an enormous amount of operation time is not required at the site. Thus, a load on an operator at the site is reduced. In addition, in the related art example described in Patent Literature 2, the server transmits together an update command and update data which is software for update, to the maintenance target apparatus. After completion of reception, update of software is executed at the time of restart.

However, for an air-conditioning apparatus management apparatus and an air-conditioning apparatus among the maintenance target apparatuses, a wide variety of points to be considered are present when the server performs maintenance of software. For example, an air-conditioning system which manages an air-conditioning apparatus management apparatus and an air-conditioning apparatus with a server continuously monitors the air-conditioning apparatus over 24 hours. In addition, air-conditioning apparatuses managed by such an air-conditioning system are different in air-conditioning load for each piece of real estate. Thus, after completion of update of software, it is difficult for the server to uniquely determine the timing of restart of each air-conditioning apparatus. Moreover, such an air-conditioning system uses a dedicated transmission line for communication with each air-conditioning apparatus. With the dedicated transmission line, the communication speed is slow as compared to communication via a general transmission line, for example, a LAN (Local Area Network) or the like. Thus, the server takes a large amount of time to transmit software to be updated.

In any cases, update of software is performed without taking the air-conditioning load of each air-conditioning apparatus into consideration. Thus, this may affect operation of the air-conditioning system.

In the related art example described in Patent Literature 3, when the version of the software is not the latest version, the receiving side apparatus does not execute update of software. Thus, an operation load required for update of software is reduced in the entire air-conditioning system.

However, also in the related art example described in Patent Literature 3, update of software is not executed in consideration of the air-conditioning load of an air-conditioning apparatus. Thus, even if update of software is executed when the latest version of software is received, this may affect operation of the air-conditioning system depending on a state of the air-conditioning load of the air-conditioning apparatus.

In other words, when the air-conditioning system corresponding to the related art described in Patent Literature 1 to Patent Literature 3 executes update of software, there is a problem that this may affect operation of the air-conditioning system.

The present invention has been made to solve the above-described problems, and an object of the present invention is to provide an air-conditioning system which allows update of software to be executed without affecting operation of the air-conditioning system.

Solution to Problem

An air-conditioning system according to the present invention is an air-conditioning system including an air-conditioning apparatus management apparatus and an air-conditioning apparatus which transmits and receives various signals to and from the air-conditioning apparatus management apparatus. The air-conditioning apparatus management apparatus manages the air-conditioning apparatus, an operational state of the air-conditioning apparatus management apparatus is linked to an operational state of the air-conditioning apparatus, and software set in the air-conditioning apparatus management apparatus is updated based on the operational state of the air-conditioning apparatus management apparatus.

Advantageous Effects of Invention

In the present invention, a series of processes is executed based on the air-conditioning apparatus of the operational state, and thus an effect of enabling update of software to be executed without affecting operation of the air-conditioning system is obtained.

DESCRIPTION OF EMBODIMENTS

Hereinafter, Embodiments of present invention will be described in detail with reference to the drawings. It should be noted that steps describing a program which performs operation in each of Embodiments 1 to 4 of the present invention are processes performed time-sequentially in the order in which the steps are described, but may not necessarily be performed time-sequentially, and may include processes performed in parallel or individually.

In addition, each function described in Embodiments 1 to 4 is achieved by means of hardware or software. That is, each block diagram described in Embodiments 1 to 4 may be considered as a block diagram of hardware or as a functional block diagram of software. For example, each block diagram may be achieved by means of hardware such as a circuit device, or may be achieved by means of software executed on an arithmetic unit such as a processor which is not shown.

In addition, regarding each block in block diagrams described in Embodiments 1 to 4, its function only has to be performed, and the configuration for each block may not be separated from each other.

In addition, each flag example or the like described in Embodiments 1 to 4 is an example, and is not particularly limited thereto.

It should be noted that elements that are not specifically described in each of Embodiments 1 to 4 are the same as those described in each of Embodiments 1 to 4, and the same functions and configurations are denoted by the same reference signs.

Embodiments 1 to 4 may be implemented solely or implemented in combination. In any of the cases, advantageous effects described below are achieved.

Embodiment 1

Figure 1:
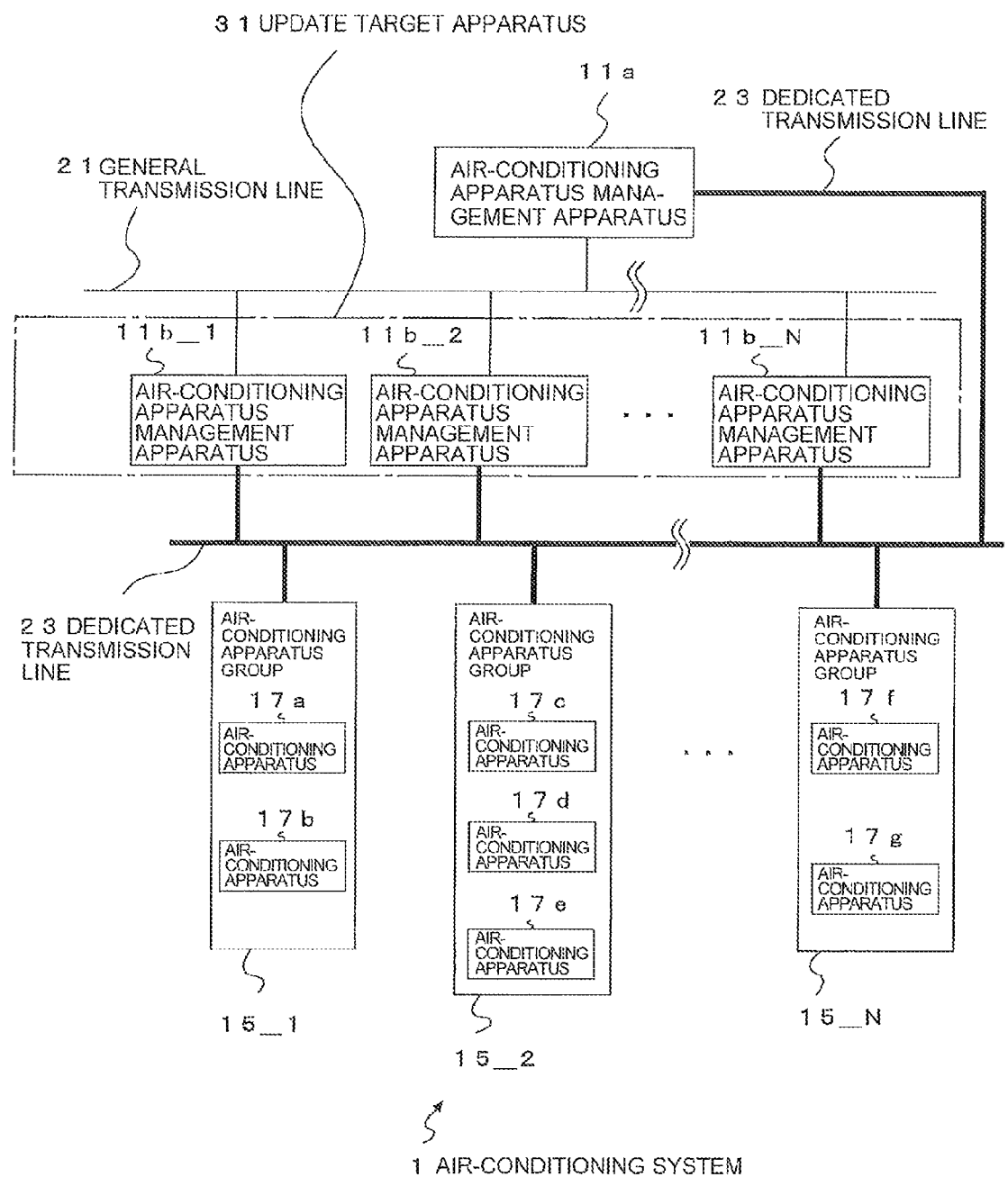
FIG. 1 is a diagram showing an example of a schematic configuration of an air-conditioning system 1 according to Embodiment 1 of the present invention, wherein air-conditioning apparatus management apparatuses 11b_1 to 11b_N are set as an update target apparatus.

FIG. 1 is a diagram showing an example of a schematic configuration of an air-conditioning system 1 according to Embodiment 1 of the present invention, wherein air-conditioning apparatus management apparatuses 11b_1 to 11b_N are set as an update target apparatus 31.

As shown in FIG. 1, the air-conditioning system 1 includes an air-conditioning apparatus management apparatus 11a, the air-conditioning apparatus management apparatuses 11b_1 to 11b_N, air-conditioning apparatus groups 15_1 to 15_N, and the like. The air-conditioning apparatus management apparatus 11a and the air-conditioning apparatus management apparatuses 11b_1 to 11b_N are connected to each other via a general transmission line 21. The general transmission line 21 is a transmission line through which communication is performed in compliance with a communication protocol that is opened to the public. The general transmission line 21 is implemented, for example, as a LAN (Local Area Network). It should be noted that the general transmission line 21 is not limited to the LAN.

When each of the air-conditioning apparatus management apparatuses 11b_1 to 11b_N is not particularly distinguished from the others, the air-conditioning apparatus management apparatuses 11b_1 to 11b_N are referred to as air-conditioning apparatus management apparatus 11b. In addition, when the air-conditioning apparatus management apparatus 11a and the air-conditioning apparatus management apparatus 11b are not particularly distinguished from each other, the air-conditioning apparatus management apparatus 11a and the air-conditioning apparatus management apparatus 11b are referred to as air-conditioning apparatus management apparatus 11. In addition, as shown in FIG. 1, the air-conditioning apparatus management apparatus 11b is set as the update target apparatus 31.

The air-conditioning apparatus management apparatus 11 and the air-conditioning apparatus groups 15_1 to 15_N are connected to each other via a dedicated transmission line 23.

The dedicated transmission line 23 is a transmission line through which communication is performed in compliance with a communication protocol that is not opened to the public. The air-conditioning apparatus management apparatus 11 manages the air-conditioning apparatus groups 15_1 to 15_N. For example, the air-conditioning apparatus management apparatus 11 acquires various states of the air-conditioning apparatus groups 15_1 to 15_N. In addition, for example, as maintenance of software of the air-conditioning apparatus groups 15_1 to 15_N, the air-conditioning apparatus management apparatus 11 upgrades the software.

The air-conditioning apparatus group 15_1 includes, for example, an air-conditioning apparatus 17a and an air-conditioning apparatus 17b. In the air-conditioning apparatus 17a and the air-conditioning apparatus 17b, the same area is set as an air-conditioned space, and the air-conditioning apparatus 17a and the air-conditioning apparatus 17b control air in the set air-conditioned space. The air-conditioning apparatus group 15_2 includes, for example, air-conditioning apparatuses 17c to 17e. In the air-conditioning apparatuses 17c to 17e, the same area is set as an air-conditioned space, and the air-conditioning apparatuses 17c to 17e control air in the set air-conditioned space. The air-conditioning apparatus group 15_N includes, for example, an air-conditioning apparatus 17f and an air-conditioning apparatus 17g. In the air-conditioning apparatus 17f and the air-conditioning apparatus 17g, the same area is set as an air-conditioned space, and the air-conditioning apparatus 17f and the air-conditioning apparatus 17g controls air in the set air-conditioned space.

It should be noted that in the respective air-conditioning apparatus groups 15_1 to 15_N, different areas are assumed to be set as air-conditioned spaces, but the same area may be set as an air-conditioned space. In addition, when each of the air-conditioning apparatus groups 15_1 to 15_N is not particularly distinguished from the others, the air-conditioning apparatus groups 15_1 to 15_N are referred to as air-conditioning apparatus group 15. In addition, when each of the air-conditioning apparatuses 17a to 17g is not particularly distinguished from the others, the air-conditioning apparatuses 17a to 17g are referred to as air-conditioning apparatus 17. That is, the air-conditioning apparatus group 15 is an apparatus group which includes a plurality of air-conditioning apparatuses 17 and controls air in the target area.

The air-conditioning apparatus 17 is, for example, any of an outdoor unit, an indoor unit, a ventilation facility, a total heat exchanger, a humidifier, a dehumidifier, a heater, and the like. That is, an outdoor unit, an indoor unit, a ventilation facility, a total heat exchanger, a humidifier, a dehumidifier, a heater, or the like is connected to the air-conditioning apparatus management apparatus 11 via the dedicated transmission line 23.

Connection between a plurality of the air-conditioning apparatus management apparatuses 11 and a plurality of the air-conditioning apparatus groups 15 is not particularly limited. For example, the air-conditioning apparatus management apparatus 11a may integrally manage the air-conditioning apparatus groups 15_1 to 15_N. The air-conditioning apparatus management apparatus 11b_1 may manage the air-conditioning apparatus group 15_1. The air-conditioning apparatus management apparatus 11b_2 may manage the air-conditioning apparatus group 15_2. The air-conditioning apparatus management apparatus 11b_N may manage the air-conditioning apparatus group 15_N.

In addition, connection between the air-conditioning apparatus management apparatus 11a and each of the air-conditioning apparatus management apparatuses 11b_1 to 11b_N is not particularly limited. For example, in FIG. 1, a case is assumed in which the air-conditioning apparatus management apparatus 11a manages the air-conditioning apparatus management apparatus 11b as an update target apparatus 31. The air-conditioning system 1 described with reference to FIG. 1 is shown as an example, and is not particularly limited thereto.

Figure 2:
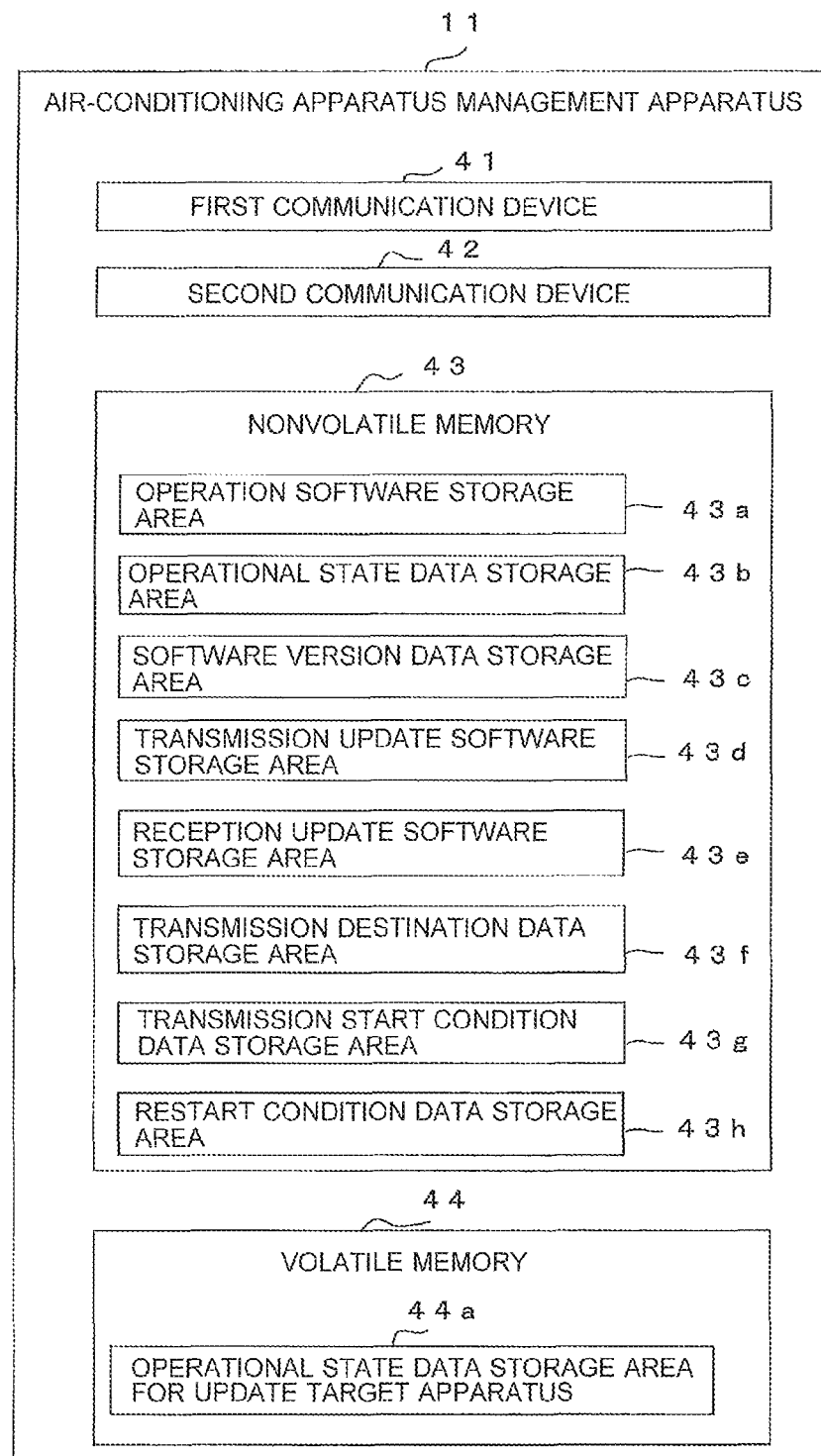
FIG. 2 is a diagram showing an example of the functional configuration of an air-conditioning apparatus management apparatus 11 according to Embodiment 1 of the present invention.

Next, the air-conditioning apparatus management apparatus 11 will be described in detail. FIG. 2 is a diagram showing an example of the functional configuration of the air-conditioning apparatus management apparatus 11 according to Embodiment 1 of the present invention. As shown in FIG. 2, the air-conditioning apparatus management apparatus 11 includes a first communication device 41, a second communication device 42, a nonvolatile memory 43, and a volatile memory 44. The first communication device 41 transmits and receives various signals to and from an air-conditioning apparatus management apparatus 11 other than the self-apparatus. That is, the first communication device 41 transmits and receives various signals via the general transmission line 21 through which communication is performed in compliance with a communication protocol for the air-conditioning apparatus management apparatus 11. The second communication device 42 transmits and receives various signals to and from the air-conditioning apparatus 17. That is, the second communication device 42 transmits and receives various signals via the dedicated transmission line 23 through which communication is performed in compliance with the communication protocol for the air-conditioning apparatus 17.

The nonvolatile memory 43 is composed of, for example, a nonvolatile semiconductor memory, and continuously retains data regardless of presence/absence of supply of power to a power supply. The nonvolatile memory 43 is formed, for example, as a flash memory among rewritable nonvolatile semiconductor memories. A flash memory is a memory called flash EEPROM (Electrically Erasable Programmable Read-Only Memory) or flash ROM. The nonvolatile memory 43 is not limited to the flash memory.

To a logical space formed by the nonvolatile memory 43, an operation software storage area 43a, an operational state data storage area 43b, a software version data storage area 43c, a transmission update software storage area 43d, a reception update software storage area 43e, a transmission destination data storage area 43f, a transmission start condition data storage area 43g, and a restart condition data storage area 43h are allocated.

Operation software is stored in the operation software storage area 43a. The operation software is software to be executed in the air-conditioning apparatus management apparatus 11, and, for example, monitors power consumption of an apparatus being currently managed. The operation software is not particularly limited thereto. In addition, a plurality of different types of operation software may be stored in the operation software storage area 43a.

The example where the operation software is stored as software in the operation software storage area 43a has been described above, but there is no particular limitation thereto. For example, the software may be divided in unit of module, which is an element of software, and stored. In addition, the software may be divided in unit of program, which is an element of a module, and stored. In addition, the software may be stored as a single program. In the case where the software is divided and stored, for example, one executable file may be created from a plurality of elements by using codes such as Makefile used in C language programing. The one method of C language programming has been described above, but the software does need to be particularly described in a specific language.

In any of the cases, codes of an algorithm for operating the air-conditioning apparatus management apparatus 11 or the air-conditioning apparatus 17 only need to be stored in the operation software storage area 43a, and the mount form regarding the codes, such as programming unit, a programming method, a programming mount method, and a programming mount environment, is not particularly limited.

Update of the operation software, that is, the form of an update process of the operation software, is not particularly limited. For example, the update process may be performed by replacing the operation software stored in the operation software storage area 43a with new operation software. In addition, for example, in the case where the operation software is divided and stored, the update process may be performed as a whole by replacing only elements obtained by the division. In any of the cases, when being executed, an executable file stored as a source code only needs to be developed into object codes on any of the logical spaces, for example, on the operation software storage area 43a, and the developed object codes only need to operate based on a command from a CPU (Central Processing Unit) which is not shown.

Operational state data of various apparatuses is stored in the operational state data storage area 43b. For example, an operational state of the air-conditioning apparatus management apparatus 11 is stored as the operational state data of various apparatuses. Specifically, a load state or the like of the air-conditioning apparatus management apparatus 11 is stored. In addition, for example, data indicating an operational state of the air-conditioning apparatus 17 being currently managed by the air-conditioning apparatus management apparatus 11 is stored as the operational state data of various apparatuses. Specifically, data indicating a state of being operating operation, being stopping, being starting up, or the like is stored as an operational state of the air-conditioning apparatus 17. Data indicating an operational state of an air-conditioning apparatus management apparatus 11 other than the self-apparatus may be stored in the operational state data storage area 43b. In addition, data indicating an operational state of the air-conditioning apparatus 17 being currently managed by the air-conditioning apparatus management apparatus 11 other than the self-apparatus may be stored in the operational state data storage area 43b.

A load state of the air-conditioning apparatus management apparatus 11 is changed in conjunction with an operational state of the air-conditioning apparatus 17 being currently managed by the air-conditioning apparatus management apparatus 11. Specifically, if the operational state of the air-conditioning apparatus 17 being currently managed by the air-conditioning apparatus management apparatus 11 is stopping, the load state of the air-conditioning apparatus management apparatus 11 is a low load state. Thus, if the air-conditioning apparatus management apparatus 11 acquires, for example, a load state of another air-conditioning apparatus management apparatus 11, the air-conditioning apparatus management apparatus 11 is able to determine an operational state of the air-conditioning apparatus 17 being currently managed by the other air-conditioning apparatus management apparatus 11.

Version data of the operation software stored in the operation software storage area 43a is stored in the software version data storage area 43c. As a past update history, version data of initially stored operation software to present operation software may be stored in an accumulative manner. In the case where the logical space is configured as described above, the air-conditioning apparatus management apparatus 11 is able to refer to a past version as necessary by referring to the software version data storage area 43c. Thus, in the entire air-conditioning system 1, it is possible to integrally downgrade the operation software to the past version.

Transmission update software is stored in the transmission update software storage area 43d. The transmission update software is software to be transmitted to the update target apparatus 31. In the operation software and the transmission update software, the same algorithm only needs to be described, and the mount form thereof is not particularly limited. For example, if the transmission update software is stored in a mount form that complies with the update target apparatus 31, and the air-conditioning apparatus management apparatus 11 and the update target apparatus 31 are able to communicate with each other, it is possible to perform software update in Embodiment 1 without limiting the type of the update target apparatus 31.

For example, operation software that operates in an execution environment for an XML (Extensible Markup Language) language program may be executed in the air-conditioning apparatus management apparatus 11, and transmission update software that operates in an execution environment for a VB (Visual Basic) language program may be executed in the update target apparatus 31. In any of the cases, software in a mount form suitable for each execution environment only needs to be stored. In addition, software in a mount form different from that in each execution environment may be stored. If execution environments are different, for example, the software only needs to be converted into a state suitable for the execution environment as appropriate, by using API (Application Interface) or the like.

The codes stored in the transmission update software storage area 43d do not need to be software for update. For example, software for downgrade may be stored in the transmission update software storage area 43d. In addition, for example, not only small-size data for update but also software for upgrade as large data for update may be stored in the transmission update software storage area 43d.

Reception update software is stored in the reception update software storage area 43e. For example, when the air-conditioning apparatus management apparatus 11 receives transmission update software from the air-conditioning apparatus management apparatus 11 other than the self-apparatus, the air-conditioning apparatus management apparatus 11 stores the received transmission update software into the reception update software storage area 43e.

Transmission destination data is stored in the transmission destination data storage area 43f. The transmission destination data is data which designates the update target apparatus 31. The transmission destination data is, for example, address data of the update target apparatus 31. The mount form of the address data is not particularly limited. For example, when the update target apparatus 31 is identified on the general transmission line 21, an IP address or the like only needs to be set as address data which complies with the communication protocol used for the general transmission line 21. Specifically, in the example shown in FIG. 1, address data of the air-conditioning apparatus management apparatus 11b is stored as transmission destination data in the transmission destination data storage area 43f shown in FIG. 2. In addition, for example, when the update target apparatus 31 is identified on the dedicated transmission line 23, an address which is uniquely identified as address data which complies with the communication protocol used for the dedicated transmission line 23 only needs to be set.

Transmission start condition data is stored in the transmission start condition data storage area 43g. The transmission start condition data is data based on which whether to transmit transmission update software is determined. The transmission start condition data is, for example, data indicating that all the air-conditioning apparatuses 17 being currently managed by the air-conditioning apparatus management apparatus 11 are stopping, that is, that a load state of the air-conditioning apparatus management apparatus 11 is low. For example, the air-conditioning apparatus management apparatus 11 may link a first flag to the transmission start condition data, may set the first flag at 0 as data indicating that the load state of the air-conditioning apparatus management apparatus 11 is low. When the first flag is 0, the air-conditioning apparatus management apparatus 11 may determine to transmit the transmission update software.

In the above description, the load state of the air-conditioning apparatus management apparatus 11 is determined by using the first flag, but the determination is not particularly limited thereto. The first flag is an example of a transmission start determination identifier defined as transmission start condition data. For example, since the operational state of the air-conditioning apparatus 17 being currently managed by the air-conditioning apparatus management apparatus 11 is also stored in the operational state data storage area 43b, the first flag, which is an example of the transmission start determination identifier, and the operational state of the air-conditioning apparatus 17 stored in the operational state data storage area 43b may be linked to each other, and the operational state of the air-conditioning apparatus 17 may be represented by the first flag. For example, the air-conditioning apparatus management apparatus 11 may set the first flag at 1 during which the operational state of the air-conditioning apparatus 17 is stopped, may set the first flag at 2 during which the operational state of the air-conditioning apparatus 17 is starting up, may set the first flag at 3 during which the operational state of the air-conditioning apparatus 17 is restarting, and may set the first flag at 4 during which the operational state of the air-conditioning apparatus 17 is shutting down. The air-conditioning apparatus management apparatus 11 may determine to transmit the transmission update software when the first flag is 1.

Restart condition data is stored in the restart condition data storage area 43h. The restart condition data is data based on which whether to restart the update target apparatus 31 is determined. The restart condition data is, for example, data indicating that an update software reception completion response has been received from the update target apparatus 31. For example, a second flag may be linked to the restart condition data, and the second flag may be set at 1 as data indicating that an update software reception completion response has been received from the update target apparatus 31.

The restart condition data may be different for each update target apparatus 31.

The volatile memory 44 is composed of, for example, a volatile semiconductor memory. When power is supplied to the power supply, the volatile memory 44 retains data; and when no power is supplied to the power supply, the volatile memory 44 does not retain data. The volatile memory 44 is formed, for example, as a DRAM (Dynamic Random Access Memory). The volatile memory 44 is not limited to the DRAM. An operational state data storage area 44a for the update target apparatus 31 is allocated to a logical space formed by the volatile memory 44.

In the above description, an example of the functional configuration of the air-conditioning apparatus management apparatus 11 has been described, but the functional configuration of the air-conditioning apparatus management apparatus 11 is not particularly limited thereto. As the functional configuration of the air-conditioning apparatus management apparatus 11, another function may be included. In addition, the first communication device 41 and the second communication device 42 may be formed with the same functional configuration. Moreover, the operational state data storage area 44a for the update target apparatus 31 may be allocated to the logical space formed by the nonvolatile memory 43.

The operation software storage area 43a, the operational state data storage area 43b, the software version data storage area 43c, the transmission update software storage area 43d, the reception update software storage area 43e, the transmission destination data storage area 43f, the transmission start condition data storage area 43g, and the restart condition data storage area 43h particularly do not need to be allocated to the logical space formed by the nonvolatile memory 43.

For example, by using a hash table which is not shown, the operation software storage area 43a, the operational state data storage area 43b, the software version data storage area 43c, the transmission update software storage area 43d, the reception update software storage area 43e, the transmission destination data storage area 43f, the transmission start condition data storage area 43g, and the restart condition data storage area 43h may be dynamically allocated.

Figure 3:
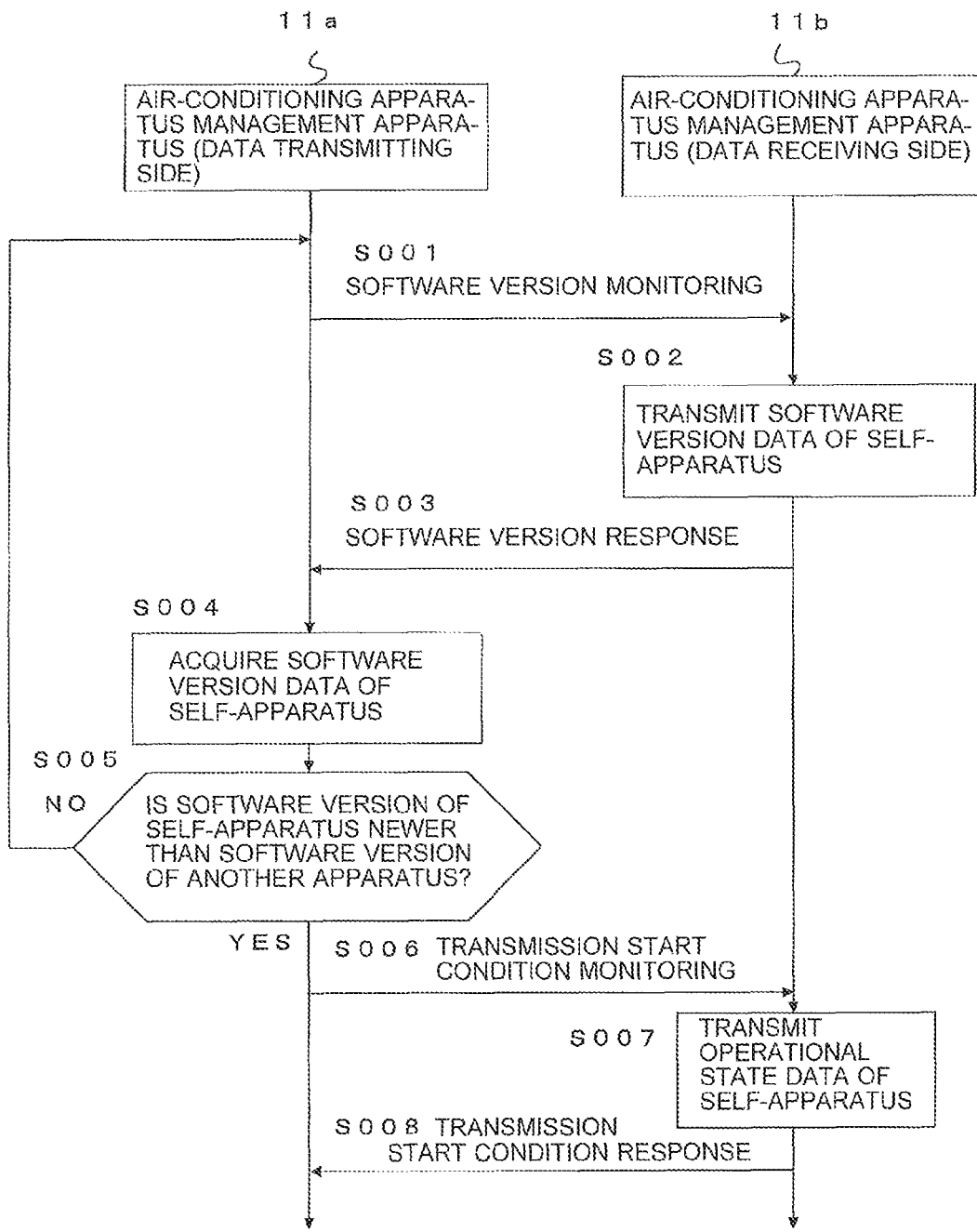
FIG. 3 is a sequence diagram illustrating an example of communication between an air-conditioning apparatus management apparatus 11a and an air-conditioning apparatus management apparatus 11b according to Embodiment 1 of the present invention.
Figure 4:
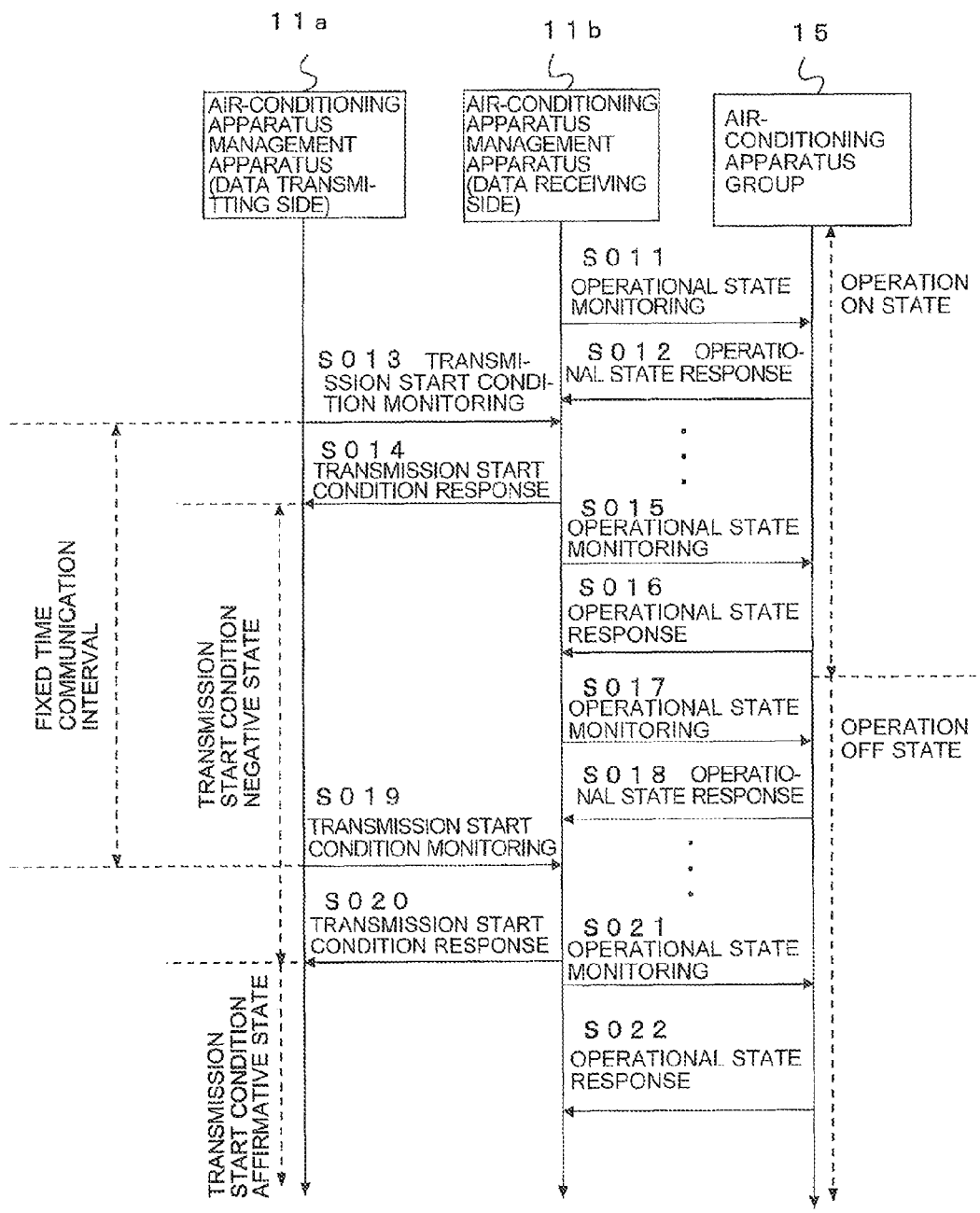
FIG. 4 is a sequence diagram illustrating an example of communication between the air-conditioning apparatus management apparatus 11a, the air-conditioning apparatus management apparatus 11b, and an air-conditioning apparatus group 15.
Figure 5:
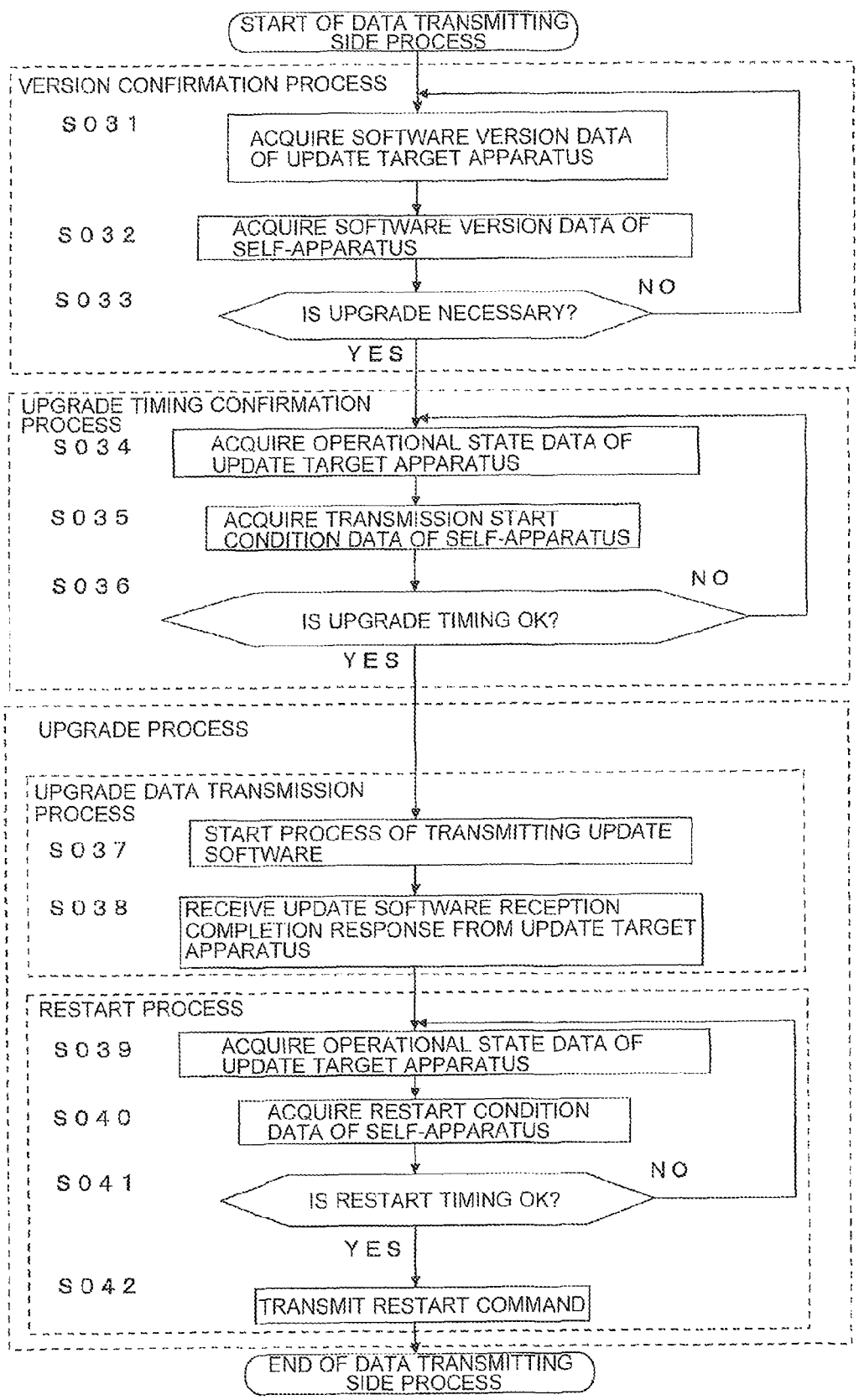
FIG. 5 is a flowchart illustrating an example of control of the data transmitting side air-conditioning apparatus management apparatus 11a according to Embodiment 1 of the present invention.

Next, a series of processes through which the air-conditioning apparatus management apparatus 11a updates software of the air-conditioning apparatus management apparatus 11b, will be described with reference to FIGS. 3 to 5. FIG. 3 is a sequence diagram illustrating an example of communication between the air-conditioning apparatus management apparatus 11a and the air-conditioning apparatus management apparatus 11b according to Embodiment 1 of the present invention. As shown in FIG. 3, as a data transmitting side, the air-conditioning apparatus management apparatus 11a periodically performs software version monitoring on the air-conditioning apparatus management apparatus 11b which is set as a data receiving side.

The software version monitoring is, for example, a preceding step of a determination as to whether to upgrade operation software (for air-conditioning apparatus management) corresponding to the air-conditioning apparatus management apparatus 11b which is set as the data receiving side, the operation software being stored in the transmission destination data storage area 43f. In addition, the air-conditioning apparatus management apparatus 11a performs a process of comparison between the software version (for air-conditioning apparatus management) of the self-apparatus and the software version (for air-conditioning apparatus management) of another apparatus which is a data transmission destination, as a succeeding step of the determination as to whether to upgrade the operation software (for air-conditioning apparatus management). The execution interval of the software version monitoring (for air-conditioning apparatus management) may be optionally set.

For example, through setting from a user, the software version monitoring (for air-conditioning apparatus management) may be set to a stop state. In addition, the software version monitoring (for air-conditioning apparatus management) may be automatically temporarily set to a stop state in accordance with the operational state of the air-conditioning apparatus management apparatus 11a which is a data transmitting side. The determination as to whether to upgrade the operation software (for air-conditioning apparatus management) is a version confirmation process for the operation software (for air-conditioning apparatus management) retained by the update target apparatus 31.

Next, the example of communication will be specifically described with reference to FIG. 3.

(Step S001)

The air-conditioning apparatus management apparatus 11a performs the software version monitoring (for air-conditioning apparatus management) on the air-conditioning apparatus management apparatus 11b.

(Step S002) and (Step S003)

The air-conditioning apparatus management apparatus 11b transmits the software version (for air-conditioning apparatus management) of the self-apparatus. Specifically, the air-conditioning apparatus management apparatus 11b transmits the software version data (for air-conditioning apparatus management) stored in the software version data storage area 43c of the self-apparatus, to the air-conditioning apparatus management apparatus 11a, thereby performing a software version response (for air-conditioning apparatus management).

(Step S004) and (Step S005)

The air-conditioning apparatus management apparatus 11a acquires the software version data (for air-conditioning apparatus management) of the self-apparatus. The air-conditioning apparatus management apparatus 11a determines whether the software version data (for air-conditioning apparatus management) of the self-apparatus is newer than the software version of the air-conditioning apparatus management apparatus 11b which is set as the data receiving side, that is, the software version (for air-conditioning apparatus management) of another apparatus. If the software version (for air-conditioning apparatus management) of the self-apparatus is not newer than the software version (for air-conditioning apparatus management) of the other apparatus, the air-conditioning apparatus management apparatus 11a returns to step S001.

On the other hand, if the software version (for air-conditioning apparatus management) of the self-apparatus is newer than the software version (for air-conditioning apparatus management) of the other apparatus, the air-conditioning apparatus management apparatus 11a proceeds to step S006 as an upgrade timing confirmation process for the operation software (for air-conditioning apparatus management). That is, the process is a process of determining whether the operation software (for air-conditioning apparatus management) of the update target apparatus 31 is the latest version (for air-conditioning apparatus management). As the assumption of the process, the version data (for air-conditioning apparatus management) retained by the data transmitting side apparatus is assumed to be the latest version (for air-conditioning apparatus management).

(Step S006) to (Step S008)

The air-conditioning apparatus management apparatus 11a performs transmission start condition monitoring. The air-conditioning apparatus management apparatus 11b transmits the operational state of the self-apparatus to the air-conditioning apparatus management apparatus 11a, thereby performing a transmission start condition response. From the standpoint of, for example, compatibility between the air-conditioning apparatus management apparatus 11a and each of the air-conditioning apparatus management apparatuses 11b_1 to 11b_N, the air-conditioning system 1 may set a comparison operation, which is the process of step S005, to a stop state, and may proceed to the transmission start condition monitoring which is a step previous to a process of updating the old version of the operation software (for air-conditioning apparatus management). In addition, the air-conditioning apparatus management apparatus 11a may downgrade the operation software (for air-conditioning apparatus management) of the air-conditioning apparatus management apparatus 11b. When downgrading, the air-conditioning apparatus management apparatus 11a only needs to determine whether the software version (for air-conditioning apparatus management) of the self-apparatus is older than the software version (for air-conditioning apparatus management) of another apparatus in the comparison process of step S005.

Next, an operation of the transmission start condition monitoring will be described in detail with reference to FIG. 4. FIG. 4 is a sequence diagram illustrating an example of communication between the air-conditioning apparatus management apparatus 11a, the air-conditioning apparatus management apparatus 11b, and the air-conditioning apparatus group 15 according to Embodiment 1 of the present invention. The transmission start condition monitoring is an upgrade timing confirmation process of determining whether the transmission start condition data stored in the transmission start condition data storage area 43g of the air-conditioning apparatus management apparatus 11a agrees with the operational state of the air-conditioning apparatus management apparatus 11b stored in the operational state data storage area 43b of the air-conditioning apparatus management apparatus 11b. The timing at which the transmission start condition monitoring is performed may be optionally set. For example, through setting from the user, the transmission start condition monitoring may be set to a stop state. In addition, the transmission start condition monitoring may be automatically temporarily set to a stop state in accordance with the operational state of the air-conditioning apparatus management apparatus 11a which is a data transmitting side.

Next, the example of communication will be specifically described with reference to FIG. 4. In the description of FIG. 4, a case is assumed in which the execution interval of the transmission start condition monitoring is set as a fixed time communication interval. The fixed time communication interval is, for example, 1 minute, but is not particularly limited thereto. In addition, in the description of FIG. 4, a case is assumed in which the transmission start condition is that all the air-conditioning apparatuses 17 corresponding to the air-conditioning apparatus group 15 have stopped. For example, in FIG. 4, an operation ON state means that all the air-conditioning apparatuses 17 are operating, and an operation OFF state means that all the air-conditioning apparatuses 17 are stopping. Thus, if the operational state of the air-conditioning apparatus management apparatus A11b is a state corresponding to the operation ON state of the air-conditioning apparatus 17, a transmission start condition negative state is replied as a transmission start condition response. In addition, if the operational state of the air-conditioning apparatus management apparatus 11b is a state corresponding to the operation OFF state of the air-conditioning apparatus 17, a transmission start condition affirmative state is replied as a transmission start condition response.

The air-conditioning apparatus management apparatus 11b is assumed to perform, as operational state monitoring, an operation on the air-conditioning apparatus group 15 at a predetermined interval. When the operational state monitoring is performed, the air-conditioning apparatus group 15 is assumed to perform an operation of replying the operational state of the self-apparatus to the air-conditioning apparatus management apparatus 11b as an operational state response.

(Step S011) and (Step S012)

The air-conditioning apparatus management apparatus 11b performs operational state monitoring on the air-conditioning apparatus group 15. The air-conditioning apparatus group 15 replies an operational state response to the air-conditioning apparatus management apparatus 11b.

(Step S013) and (Step S014)

The air-conditioning apparatus management apparatus 11a performs transmission start condition monitoring on the air-conditioning apparatus management apparatus 11b. The air-conditioning apparatus management apparatus 11b replies a transmission start condition response to the air-conditioning apparatus management apparatus 11a.

(Step S015) to (Step S018)

The air-conditioning apparatus management apparatus 11b performs operational state monitoring on the air-conditioning apparatus group 15. The air-conditioning apparatus group 15 replies an operational state response to the air-conditioning apparatus management apparatus 11b. Next, after a predetermined period comes, the air-conditioning apparatus management apparatus 11b performs operational state monitoring on the air-conditioning apparatus group 15. The air-conditioning apparatus group 15 replies an operational state response to the air-conditioning apparatus management apparatus 11b.

(Step S019) and (Step S020)

The air-conditioning apparatus management apparatus 11a performs transmission start condition monitoring on the air-conditioning apparatus management apparatus 11b. The air-conditioning apparatus management apparatus 11b replies a transmission start condition response to the air-conditioning apparatus management apparatus 11a.

(Step S021) and (Step S022)

The air-conditioning apparatus management apparatus 11b performs operational state monitoring on the air-conditioning apparatus group 15. The air-conditioning apparatus group 15 replies an operational state response to the air-conditioning apparatus management apparatus 11b. The operational state monitoring is performed every predetermined period as described above.

As a result of the process in step S020, if the air-conditioning apparatus management apparatus 11a receives a transmission start condition affirmative state from the air-conditioning apparatus management apparatus 11b, the air-conditioning apparatus management apparatus 11a transmits the transmission update software (for air-conditioning apparatus management) stored in the transmission update software storage area 43d of the self-apparatus, to the air-conditioning apparatus management apparatus 11b. The air-conditioning apparatus management apparatus 11b stores the transmission update software (for air-conditioning apparatus management) transmitted from the air-conditioning apparatus management apparatus 11a, into the reception update software storage area 43e of the self-apparatus.

It should be noted that it is possible to optionally set the transmission start condition data stored in the transmission start condition data storage area 43g of the air-conditioning apparatus management apparatus 11a. For example, in urgent situation, the air-conditioning apparatus management apparatus 11a may forcedly transmit the transmission update software (for air-conditioning apparatus management) to the air-conditioning apparatus management apparatus 11b based on any timing assumed by the operator at the site or a preset time.

After transmitting the transmission update software (for air-conditioning apparatus management), the air-conditioning apparatus management apparatus 11a determines the current operational state of the air-conditioning apparatus management apparatus 11b based on the operational state of the air-conditioning apparatus group 15. At timing when the operational state of the air-conditioning apparatus management apparatus 11b meets the restart condition data stored in the restart condition data storage area 43h, the air-conditioning apparatus management apparatus 11a develops the transmission update software (for air-conditioning apparatus management) into the operation software storage area 43a of the air-conditioning apparatus management apparatus 11b. Developing the transmission update software (for air-conditioning apparatus management) into the operation software storage area 43a of the air-conditioning apparatus management apparatus 11b means that the transmission update software (for air-conditioning apparatus management) is compiled into executable object codes. Next, the air-conditioning apparatus management apparatus 11a restarts the air-conditioning apparatus management apparatus 11b to complete update of the operation software (for air-conditioning apparatus management) of the air-conditioning apparatus management apparatus 11b.

In urgent situation, the air-conditioning apparatus management apparatus 11a may forcedly restart the air-conditioning apparatus management apparatus 11b based on any timing assumed by the operator at the site or a preset time.

The air-conditioning apparatus management apparatus 11b is assumed to have stored the transmission update software (for air-conditioning apparatus management) transmitted from the air-conditioning apparatus management apparatus 11a, into the reception update software storage area 43e. In this case, the air-conditioning apparatus management apparatus 11b acquires, via the second communication device 42, the operational state of the air-conditioning apparatus group 15 managed by the self-apparatus, and determines the operational state of the self-apparatus based on the acquired operational state of the air-conditioning apparatus group 15. As a result of the determination of the operational state of the self-apparatus, the air-conditioning apparatus management apparatus 11b develops the transmission update software (for air-conditioning apparatus management) into the operation software storage area 43a of the air-conditioning apparatus management apparatus 11b at timing when the operational state of the self-apparatus meets the restart condition stored in the restart condition data storage area 43h. After developing the transmission update software (for air-conditioning apparatus management) into the operation software storage area 43a of the air-conditioning apparatus management apparatus 11b, the air-conditioning apparatus management apparatus 11b may restart to complete update of the operation software (for air-conditioning apparatus management) of the air-conditioning apparatus management apparatus 11b.

Next, the series of processes described above will be described with reference to FIG. 5. FIG. 5 is a flowchart illustrating an example of control of the data transmitting side air-conditioning apparatus management apparatus 11a according to Embodiment 1 of the present invention. It should be noted that a process in steps S031 to S033 is a version confirmation process. In addition, a process in steps S034 to S036 is an upgrade timing confirmation process. Moreover, a process in steps S037 to S042 is an upgrade process. The upgrade process is divided into two steps. The preceding step of the upgrade process is a process in steps S037 and S038, and is an upgrade data transmission process.

The succeeding step of the upgrade process is a process in steps S039 to S042, and is a restart process. In addition, a case is assumed in which the update target apparatus 31 is the air-conditioning apparatus management apparatus 11b.

(Step 031)

The air-conditioning apparatus management apparatus 11a acquires the software version data (for air-conditioning apparatus management) of the update target apparatus 31.

(Step S032)

The air-conditioning apparatus management apparatus 11a acquires the software version data (for air-conditioning apparatus management) of the self-apparatus.

(Step S033)

The air-conditioning apparatus management apparatus 11a determines whether upgrade is necessary. If upgrade is necessary, the air-conditioning apparatus management apparatus 11a proceeds to step S034. On the other hand, if upgrade is not necessary, the air-conditioning apparatus management apparatus 11a returns to step S031. Specifically, as described above with reference to FIG. 3, the air-conditioning apparatus management apparatus 11a determines whether the software version (for air-conditioning apparatus management) of the self-apparatus indicated by the software version data (for air-conditioning apparatus management) of the self-apparatus is newer than the software version (for air-conditioning apparatus management) of the update target apparatus 31 indicated by the software version data (for air-conditioning apparatus management) of the update target apparatus 31.

(Step S034)

The air-conditioning apparatus management apparatus 11a acquires the operational state data of the update target apparatus 31.

(Step S035)

The air-conditioning apparatus management apparatus 11a acquires the transmission start condition data of the self-apparatus.

(Step S036)

The air-conditioning apparatus management apparatus 11a determines whether upgrade timing is OK. If the upgrade timing is OK, the air-conditioning apparatus management apparatus 11a proceeds to step S037. On the other hand, if the upgrade timing is not OK, the air-conditioning apparatus management apparatus 11a returns to step S034. That is, the process in step S036 is a process after reception of the transmission start condition response in the process in step S020 described above with reference to FIG. 4. That is, if the operational state data of the update target apparatus 31 agrees with the transmission start condition data of the self-apparatus, the air-conditioning apparatus management apparatus 11a is in a state where the upgrade timing is OK, that is, in the transmission start condition affirmative state described with reference to FIG. 4. On the other hand, if the operational state data of the update target apparatus 31 does not agree with the transmission start condition data of the self-apparatus, the air-conditioning apparatus management apparatus 11a is in a state where the upgrade timing is not OK, that is, in the transmission start condition negative state described with reference to FIG. 4.

(Step S037)

The air-conditioning apparatus management apparatus 11a starts a process of transmitting update software (for air-conditioning apparatus management). For example, the air-conditioning apparatus management apparatus 11a transmits the transmission update software (for air-conditioning apparatus management) stored in the transmission update software storage area 43d of the self-apparatus, to the update target apparatus 31.

(Step S038)

The air-conditioning apparatus management apparatus 11a receives an update software reception completion response from the update target apparatus 31. That is, when the transmission update software (for air-conditioning apparatus management) is transmitted from the air-conditioning apparatus management apparatus 11a to the air-conditioning apparatus management apparatus 11b which is the update target apparatus 31, the air-conditioning apparatus management apparatus 11b which is the update target apparatus 31 replies to the air-conditioning apparatus management apparatus 11a that reception has been completed.

(Step S039)

The air-conditioning apparatus management apparatus 11a acquires the operational state data of the update target apparatus 31.

(Step S040)

The air-conditioning apparatus management apparatus 11a acquires the restart condition data of the self-apparatus. Specifically, the air-conditioning apparatus management apparatus 11a acquires the restart condition data for the update target apparatus 31 recorded in the restart condition data storage area 43h of the self-apparatus.

(Step S041)

The air-conditioning apparatus management apparatus 11a determines whether restart timing is OK. If the restart timing is OK, the air-conditioning apparatus management apparatus 11a proceeds to Step S042. On the other hand, if the restart timing is not OK, the air-conditioning apparatus management apparatus 11a returns to step S039. Specifically, if the operational state of the update target apparatus 31 agrees with the restart condition data of the self-apparatus, the air-conditioning apparatus management apparatus 11a determines that the restart timing is OK. On the other hand, if the operational state of the update target apparatus 31 does not agree with the restart condition data of the self-apparatus, the air-conditioning apparatus management apparatus 11a determines that the restart timing is not OK.

(Step S042)

The air-conditioning apparatus management apparatus 11a transmits a restart command. Specifically, the air-conditioning apparatus management apparatus 11a transmits a restart command to the air-conditioning apparatus management apparatus 11b, which is the update target apparatus 31, to restart the air-conditioning apparatus management apparatus 11b.

According to the above description, the air-conditioning apparatus management apparatus 11a transmits the update software (for air-conditioning apparatus management) if the software version (for air-conditioning apparatus management) of the self-apparatus is the latest version and the operational state of the air-conditioning apparatus management apparatus 11b which is the update target apparatus 31 meets the transmission start condition. In other words, the air-conditioning apparatus management apparatus 11a is able to update the operation software (for air-conditioning apparatus management) at timing which takes into consideration the operational state of the air-conditioning apparatus management apparatus 11b which is the update target apparatus 31. Thus, the air-conditioning apparatus management apparatus 11a is able to transmit the operation software for update (for air-conditioning apparatus management) to the air-conditioning apparatus management apparatus 11b which is the update target apparatus 31, without interfering with operation of the directly or indirectly related air-conditioning apparatus 17, and is able to update the operation software (for air-conditioning apparatus management) of the update target apparatus 31.

In the above description, an example of the case where the air-conditioning apparatus management apparatus 11*a* is a data transmitting side has been described, but the data transmitting side is not particularly limited thereto. For example, the air-conditioning apparatus management apparatus 11*b*_2 may be a data transmitting side.

As described above, in Embodiment 1, the air-conditioning system 1 is provided with the air-conditioning apparatus management apparatus 11 and the air-conditioning apparatus 17 which transmits and receives various signals to and from the air-conditioning apparatus management apparatus 11, and is configured such that the air-conditioning apparatus management apparatus 11 manages the air-conditioning apparatus 17, the operational state of the air-conditioning apparatus management apparatus 11 is linked to the operational state of the air-conditioning apparatus 17, and software (for air-conditioning apparatus management) set in the air-conditioning apparatus management apparatus 11 is updated based on the operational state of the air-conditioning apparatus management apparatus 11.

Because of the above configuration, the series of processes are performed based on the operational state of the air-conditioning apparatus 17, and thus it is possible to update the software (for air-conditioning apparatus management) without influencing operation of the air-conditioning system 1.

In Embodiment 1, a plurality of the air-conditioning apparatus management apparatuses 11 are provided, and some air-conditioning apparatus management apparatus 11*a* of the plurality of the air-conditioning apparatus management apparatuses 11 updates the software (for air-conditioning apparatus management) set in some other air-conditioning apparatus management apparatus 11*b* of the plurality of the air-conditioning apparatus management apparatuses 11, based on the operational state of the some other air-conditioning apparatus management apparatus 11*b*.

Therefore, it is possible to update the software (for air-conditioning apparatus management) without particularly influencing operation of the air-conditioning system 1.

Embodiment 2

Figure 6:
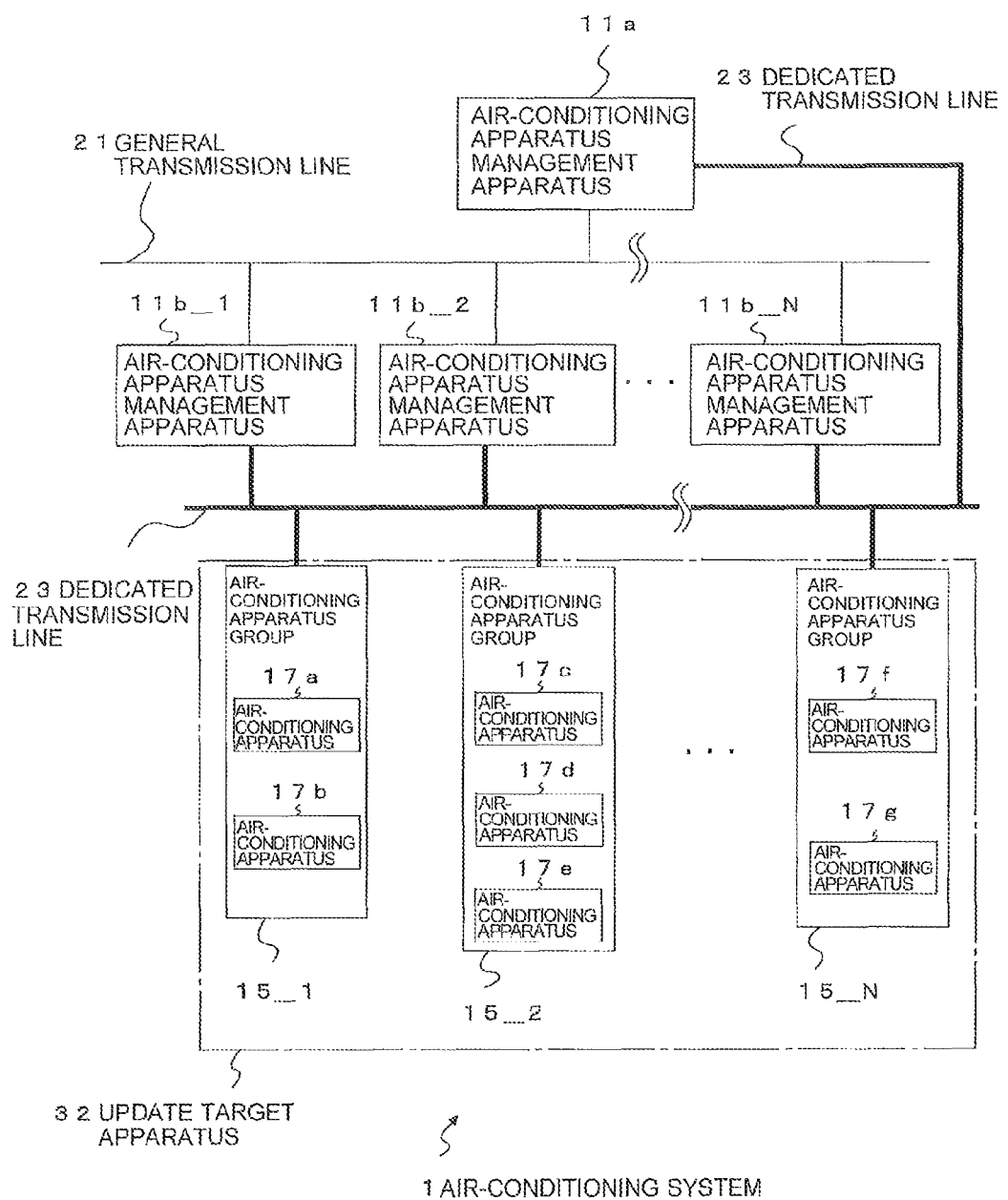
FIG. 6 is a diagram showing an example of a schematic configuration of an air-conditioning system 1 according to Embodiment 2 of the present invention, wherein air-conditioning apparatus groups 15_1 to 15_N are set as an update target apparatus.

The difference from Embodiment 1 is that the air-conditioning apparatus group 15 is set as an update target apparatus 32. FIG. 6 is a diagram showing an example of a schematic configuration of an air-conditioning system 1 according to Embodiment 2 of the present invention, wherein the air-conditioning apparatus groups 15_1 to 15_N are set as the update target apparatus 32. As shown in FIG. 6, each air-conditioning apparatus 17 which is a member of the air-conditioning apparatus group 15 is connected to the air-conditioning apparatus management apparatus 11 via the dedicated transmission line 23. In order to update the operation software (for air-conditioning apparatus) of each air-conditioning apparatus 17, the operator at the site connects a terminal or the like having update software (for air-conditioning apparatus) installed therein, to the air-conditioning apparatus 17 and performs update in many cases. Thus, the operator at the site takes an enormous amount of time to update the operation software (for air-conditioning apparatus) of each air-conditioning apparatus 17.

Since the air-conditioning apparatus 17 operates all day long in many cases, it is necessary to perform an upgrade process for the operation software (for air-conditioning apparatus) in a time period in which no problem arises even when operation of the air-conditioning apparatus 17 is stopped, such as in the middle of the night. Therefore, a burden on the operator at the site is high.

Thus, in Embodiment 2, the operation software (for air-conditioning apparatus) of the air-conditioning apparatus 17 is updated from the air-conditioning apparatus management apparatus 11, whereby the operation software (for air-conditioning apparatus) of the air-conditioning apparatus 17 is updated without the operator visiting to the site to perform a working operation. In Embodiment 2, the air-conditioning apparatus management apparatus 11 updates the operation software (for air-conditioning apparatus) at timing which takes into consideration the operational state of the air-conditioning apparatus 17 which is the update target apparatus 32.

In Embodiment 2, the address data of the air-conditioning apparatus 17 which is the update target apparatus 32 is stored in the transmission destination data storage area 43*f* shown in FIG. 2 described above. The address data of the air-conditioning apparatus 17 may be associated with the air-conditioning apparatus 17 being currently managed by the air-conditioning apparatus management apparatus 11, or may be associated with the air-conditioning apparatus 17 not being currently managed by the air-conditioning apparatus management apparatus 11. In addition, the transmission update software (for air-conditioning apparatus) of the air-conditioning apparatus 17 which is the update target apparatus 32 is stored in the transmission update software storage area 43*d* shown in FIG. 2 described above. The transmission update software (for air-conditioning apparatus) of the air-conditioning apparatus 17 does not need to be limited to one type.

For example, the transmission update software (for air-conditioning apparatus) of the air-conditioning apparatus 17 may be stored in the transmission update software storage area 43*d* as software (for air-conditioning apparatus) different for each type of the air-conditioning apparatus 17. In addition, for example, the transmission update software (for air-conditioning apparatus) of the air-conditioning apparatus 17 may be stored in the transmission update software storage area 43*d* as software (for air-conditioning apparatus) different for each address of the air-conditioning apparatus 17. That is, when different transmission update software (for air-conditioning apparatus) for different purposes is previously prepared, it is possible to update the transmission update software in accordance with the air-conditioning system 1. It is needless to say that in Embodiment 2, software for update (for air-conditioning apparatus) which is a target when the air-conditioning apparatus management apparatus 11 which is the transmitting side confirms the software version (for air-conditioning apparatus) of the self-apparatus is the operation software (for air-conditioning apparatus) of the air-conditioning apparatus 17 which is an update target.

Figure 7:
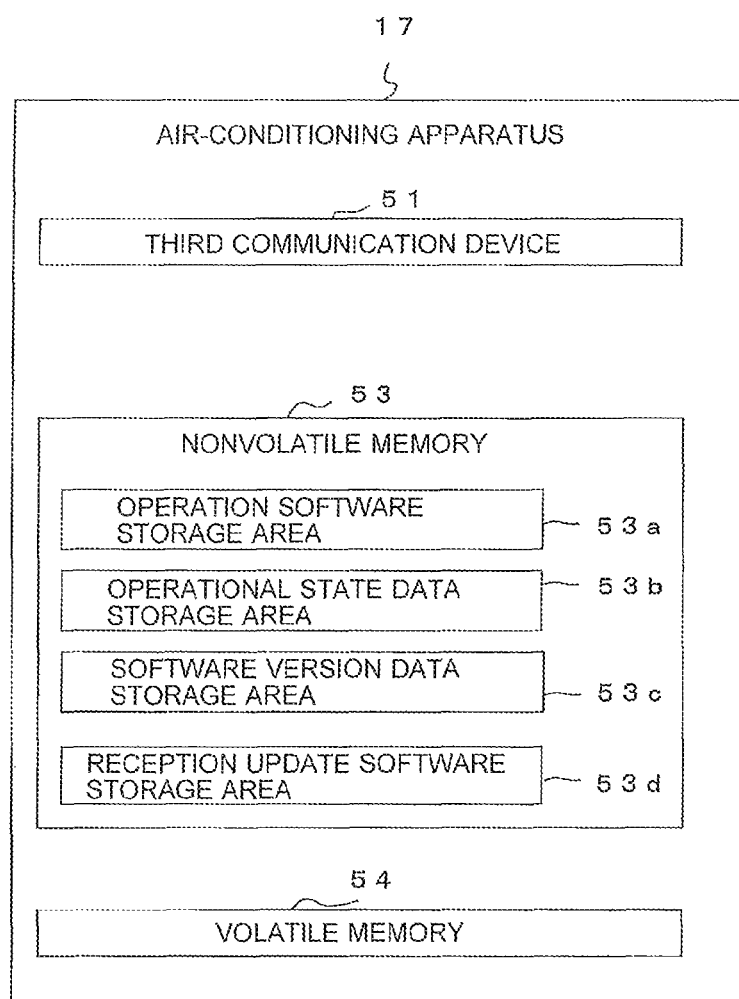
FIG. 7 is a diagram showing an example of the functional configuration of an air-conditioning apparatus 17 according to Embodiment 2 of the present invention.

FIG. 7 is a diagram showing an example of the functional configuration of the air-conditioning apparatus 17 according to Embodiment 2 of the present invention. As shown in FIG. 7, the air-conditioning apparatus 17 includes a third communication device 51, a nonvolatile memory 53, and a volatile memory 54. The third communication device 51 transmits and receives various signals to and from the air-conditioning apparatus management apparatus 11. That is, the third communication device 51 transmits and receives various signals via the dedicated transmission line 23 through which communication is performed in compliance with the communication protocol for the air-conditioning apparatus 17.

An operation software storage area 53a, an operational state data storage area 53b, a software version data storage area 53c, and a reception update software storage area 53d are allocated to a logical space formed by the nonvolatile memory 53.

The functional configuration of the air-conditioning apparatus 17 is not limited to the above description, and another functional configuration may be provided.

Figure 8:
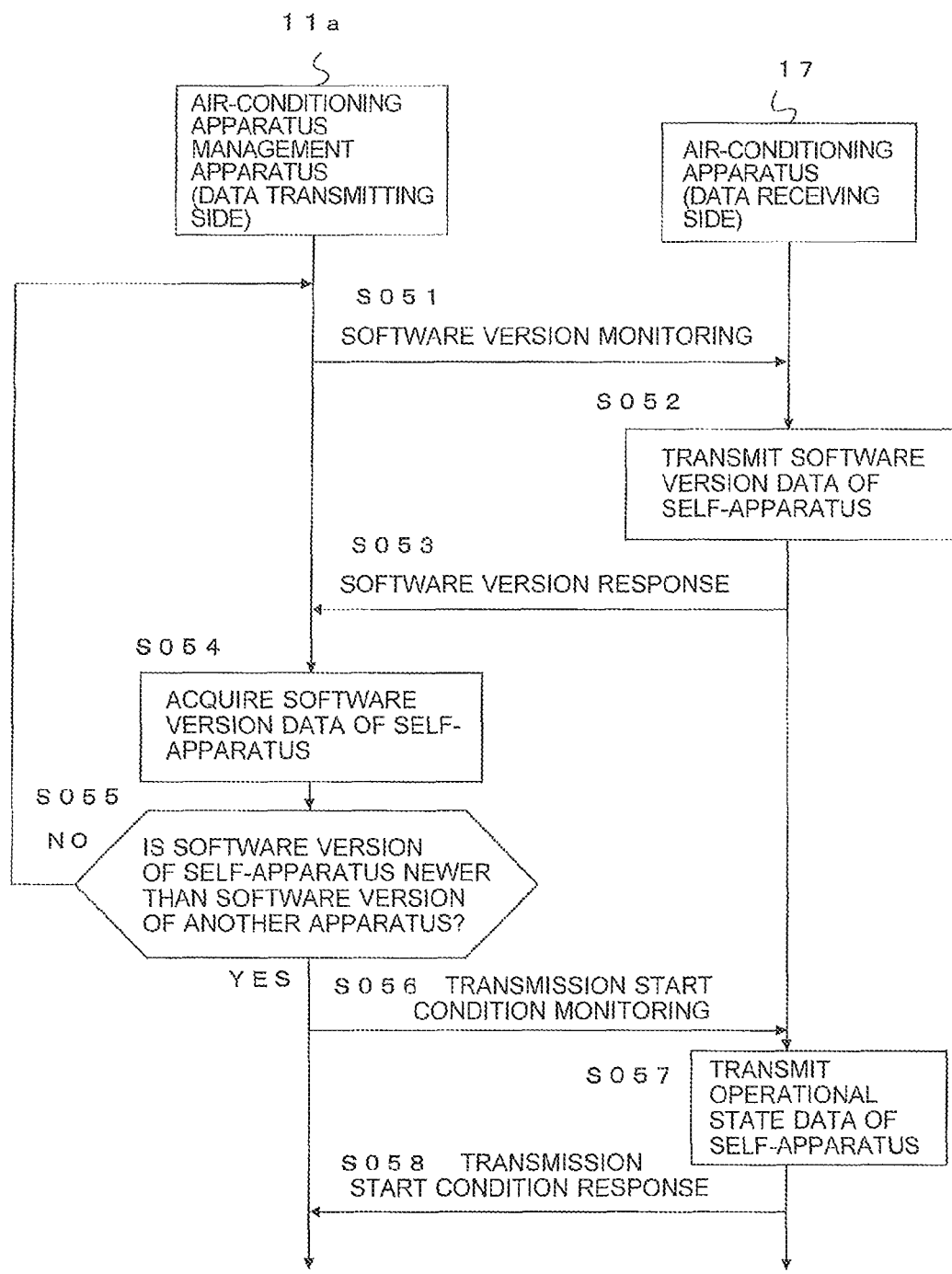
FIG. 8 is a sequence diagram illustrating an example of communication regarding software version monitoring among examples of communication between an air-conditioning apparatus management apparatus 11a and the air-conditioning apparatus 17 according to Embodiment 2 of the present invention.

FIG. 8 is a sequence diagram illustrating an example of communication regarding software version monitoring (for air-conditioning apparatus) among examples of communication between the air-conditioning apparatus management apparatus 11a and the air-conditioning apparatus 17 according to Embodiment 2 of the present invention. The difference from the description of FIG. 3 described above is that the update target apparatus 32 is the air-conditioning apparatus 17, not the air-conditioning apparatus management apparatus 11b. The other points are the same as in the communication example in FIG. 3 described above, and thus the description thereof is omitted.

Figure 9:
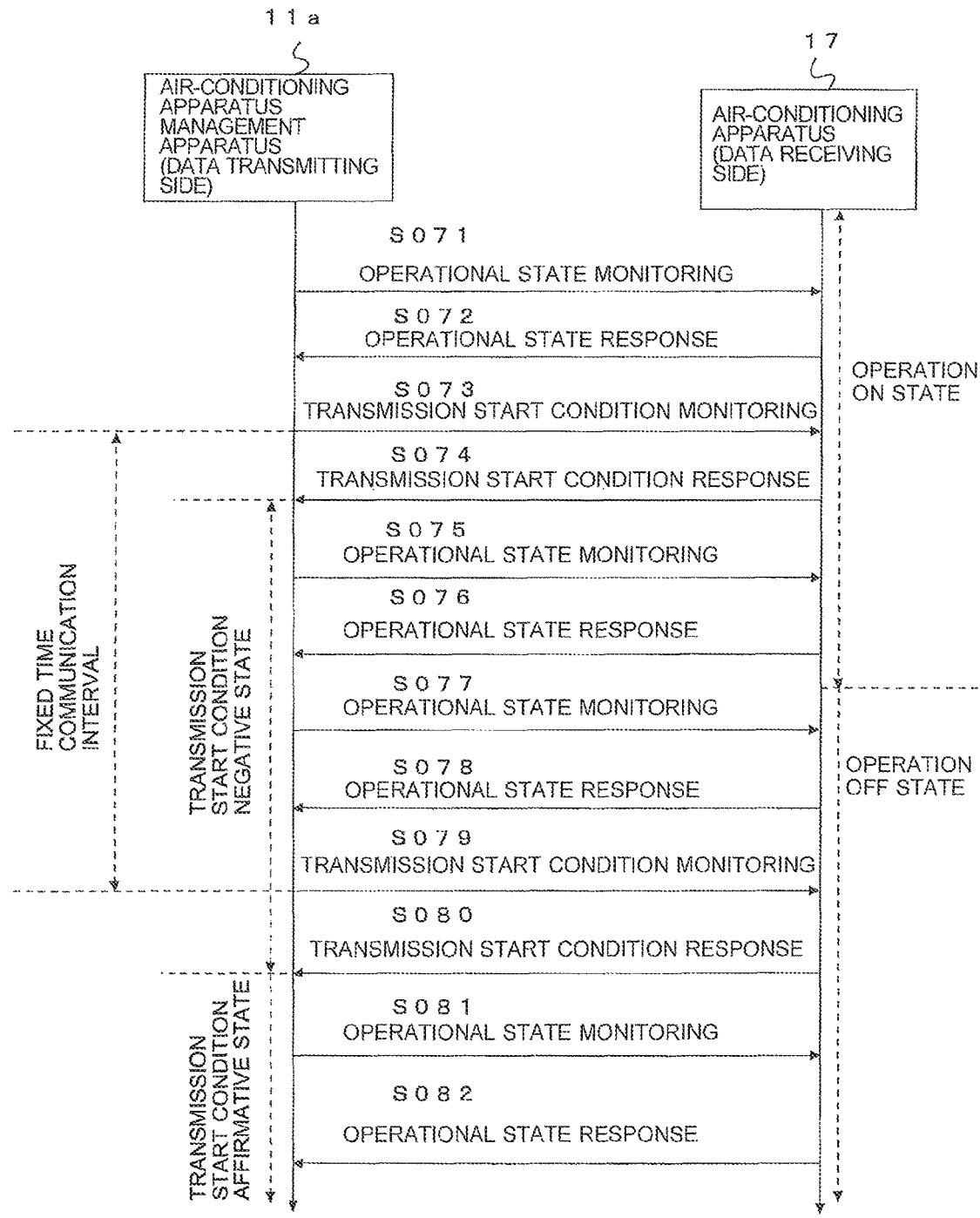
FIG. 9 is a sequence diagram illustrating an example of communication regarding transmission start condition monitoring among the examples of communication between the air-conditioning apparatus management apparatus 11a and the air-conditioning apparatus 17 according to Embodiment 2 of the present invention.

FIG. 9 is a sequence diagram illustrating an example of communication regarding transmission start condition monitoring among examples of communication between the air-conditioning apparatus management apparatus 11a and the air-conditioning apparatus 17 according to Embodiment 2 of the present invention. The difference from the description of FIG. 4 described above is that the air-conditioning apparatus management apparatus 11b is not present, and operational state monitoring, an operational state response, transmission start condition monitoring, and a transmission start condition response are performed between the air-conditioning apparatus management apparatus 11a and the air-conditioning apparatus 17 which is the update target apparatus 32. Here, it is needless to say that the software for update (for air-conditioning apparatus) which is a target when the air-conditioning apparatus management apparatus 11a which is the transmitting side confirms the software version (for air-conditioning apparatus) of the self-apparatus is the operation software (for air-conditioning apparatus) of the air-conditioning apparatus 17 which is an update target. The other points are the same as in the communication example in FIG. 4 described above, and thus the description thereof is omitted.

Figure 10:
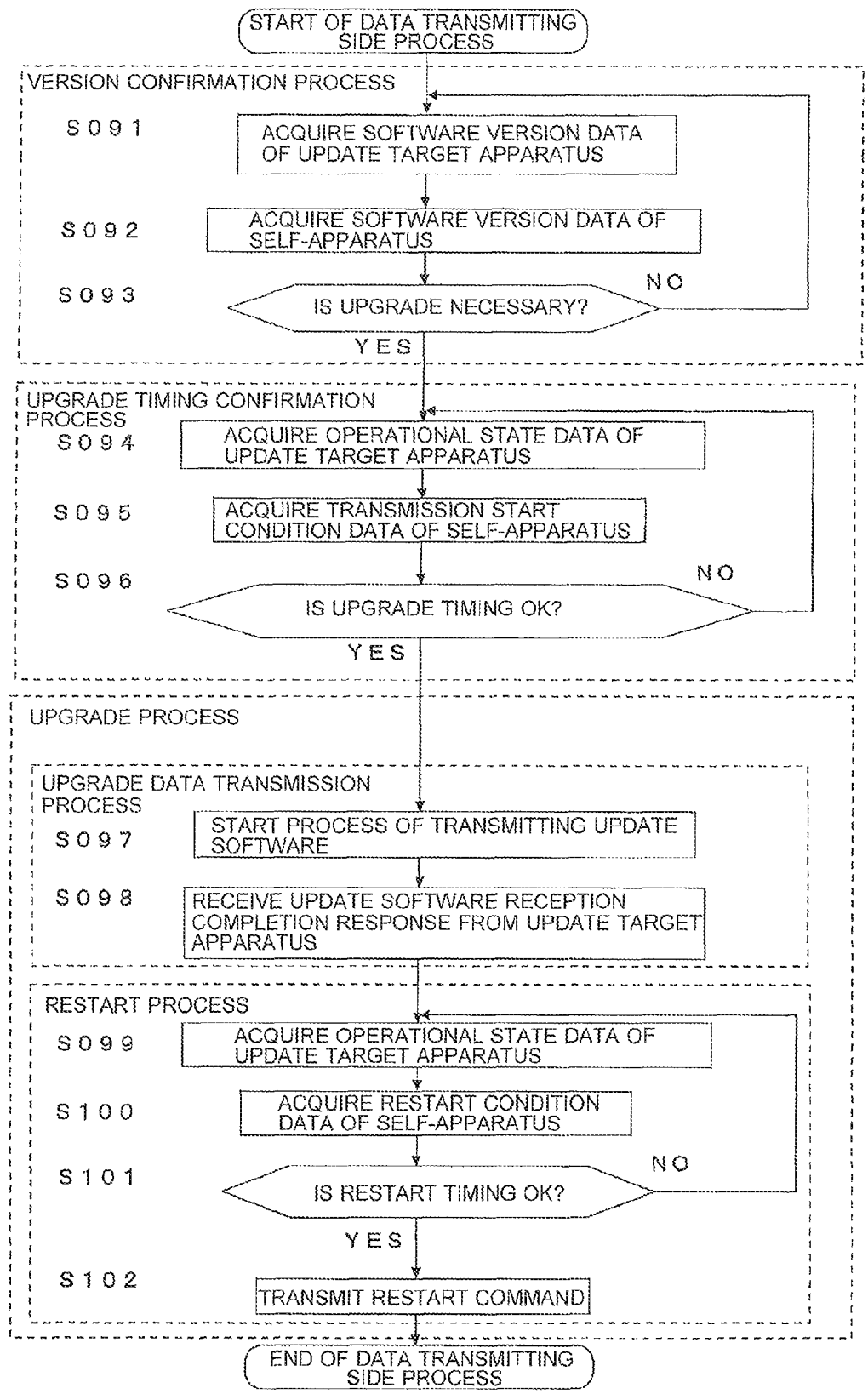
FIG. 10 is a flowchart illustrating an example of control of the data transmitting side air-conditioning apparatus management apparatus 11a according to Embodiment 2 of the present invention.

FIG. 10 is a flowchart illustrating an example of control of the data transmitting side air-conditioning apparatus management apparatus 11a according to Embodiment 2 of the present invention. The difference from the description of FIG. 5 described above is that the update target apparatus 32 is the air-conditioning apparatus 17, not the air-conditioning apparatus management apparatus 11b, and thus a process in each step shown in FIG. 10 is performed through transmission and reception of various signals between the air-conditioning apparatus management apparatus 11a and the air-conditioning apparatus 17.

That is, the air-conditioning apparatus management apparatus 11a transmits the update software (for air-conditioning apparatus) if the software version (for air-conditioning apparatus) of the self-apparatus is the latest version and the operational state of the air-conditioning apparatus 17 which is the update target apparatus 32 meets the transmission start condition. In other words, the air-conditioning apparatus management apparatus 11a is able to update the operation software (for air-conditioning apparatus) at timing which takes into consideration the operational state of the air-conditioning apparatus 17 which is the update target apparatus 32. Thus, the air-conditioning apparatus management apparatus 11a is able to transmit the operation software for update (for air-conditioning apparatus) without interfering with operation of the air-conditioning apparatus 17 which is the update target apparatus 32, and is able to update the operation software (for air-conditioning apparatus) of the update target apparatus 32.

According to the above description, in Embodiment 2, a plurality of the air-conditioning apparatuses 17 are provided, and the air-conditioning apparatus management apparatus 11 updates, based on the operational state of a management target air-conditioning apparatus 17 of the plurality of the air-conditioning apparatuses 17, the software (for air-conditioning apparatus) set in the management target air-conditioning apparatus 17.

Because of the above configuration, the series of processes are performed based on the operational state of the air-conditioning apparatus 17, and thus it is possible to update the software (for air-conditioning apparatus) without influencing operation of the air-conditioning system 1.

Embodiment 3

The difference from Embodiment 1 and Embodiment 2 is that while the software (for air-conditioning apparatus management or for air-conditioning apparatus) is updated, if the transmission start condition disagrees with the operational state of the update target apparatus 31 or 32, the update is paused; after the pause, if the transmission start condition agrees with the operational state of the update target apparatus 31 or 32, the update is restarted.

In Embodiment 1 and Embodiment 2, the operation software (for air-conditioning apparatus management or for air-conditioning apparatus) is transmitted when the operation software (for air-conditioning apparatus management or for air-conditioning apparatus) to be updated is the latest and the transmission start condition is met at the data transmitting side and the data receiving side, and restart is performed after transmission of the operation software (for air-conditioning apparatus management or for air-conditioning apparatus), thereby completing update. When update is performed through such a procedure, a problem may arise.

For example, when the volume of the transmission update software (for air-conditioning apparatus management or for air-conditioning apparatus) is large, a large amount of time is required to transmit the transmission update software (for air-conditioning apparatus management of for air-conditioning apparatus). In addition, if the speed of communication between the air-conditioning apparatus management apparatus 11a and the air-conditioning apparatus management apparatus 11b is low and the update target apparatus 31 or 32 is the air-conditioning apparatus management apparatus 11b, a large amount of time is required to transmit the transmission update software (for air-conditioning apparatus management or for air-conditioning apparatus). In addition, if the speed of communication between the air-conditioning apparatus management apparatus 11a and the air-conditioning apparatus 17 is low and the update target apparatus 31 or 32 is the air-conditioning apparatus 17, a large amount of time is required to transmit the transmission update software (for air-conditioning apparatus management or for air-conditioning apparatus). In any of the cases, if a large amount of time is taken to transmit the transmission update software (for air-conditioning apparatus management or for air-conditioning apparatus), a case is assumed in which the transmission start condition disagrees with the operational state of the update target apparatus 31 or 32.

Thus, in Embodiment 3, the operational state of the update target apparatus 31 or 32 is assumed to change if a large amount of time is taken to transmit the transmission update software (for air-conditioning apparatus management or for air-conditioning apparatus). Specifically, if the operational state of the update target apparatus 31 or 32 deviates from the transmission start condition, the air-conditioning apparatus management apparatus 11a pauses transmission of the transmission update software (for air-conditioning apparatus management or for air-conditioning apparatus) by temporarily stopping the transmission. In addition, if the operational state of the update target apparatus 31 or 32 agrees with the transmission start condition again, the air-conditioning apparatus management apparatus 11a restarts the transmission of the transmission update software (for air-conditioning apparatus management or for air-conditioning apparatus) which has been paused by being temporarily stopped. As shown in FIG. 9, transmission start condition monitoring is assumed to be repeatedly performed every fixed time communication interval.

Figure 11:
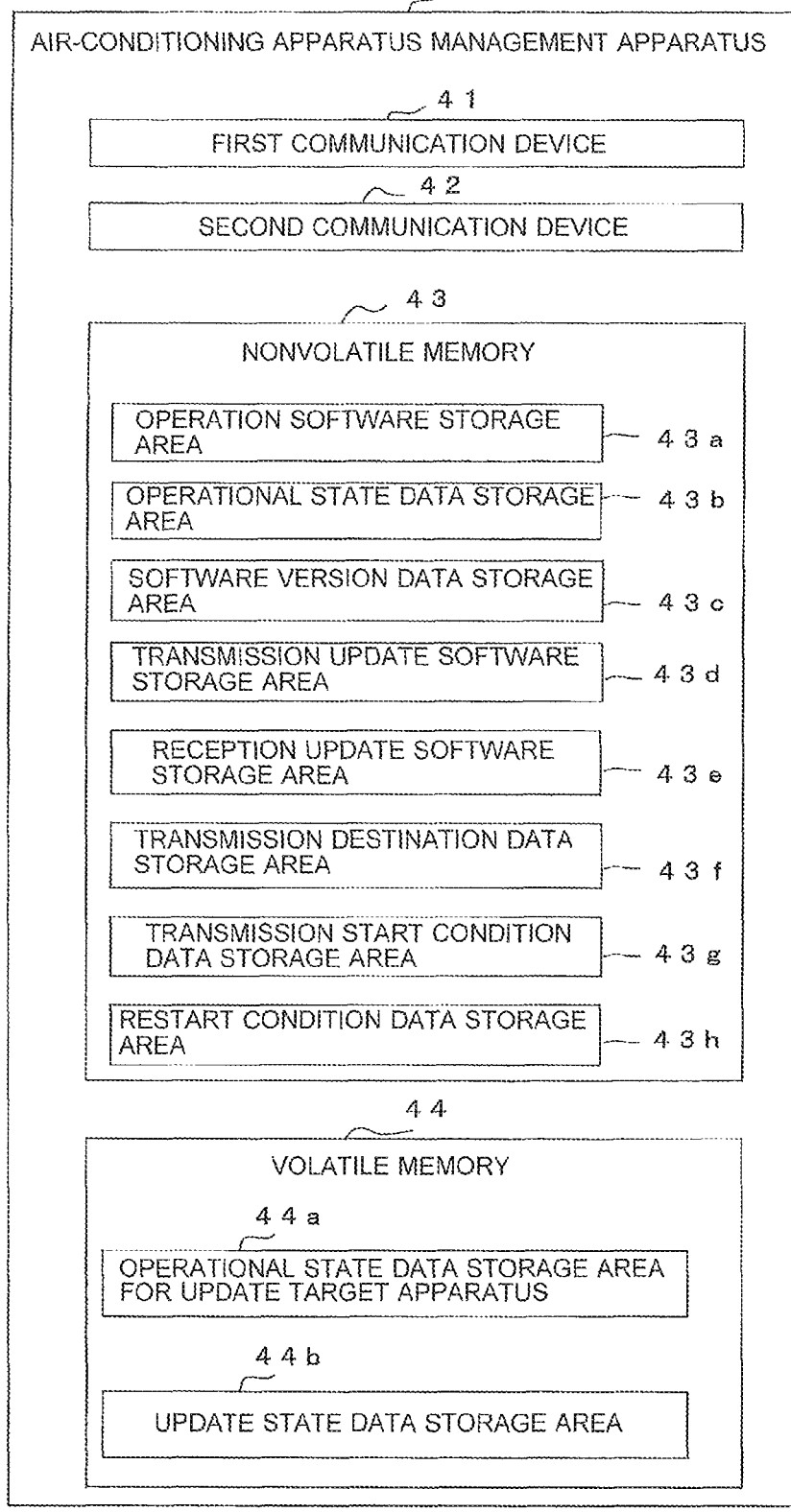
FIG. 11 is a diagram showing an example of the functional configuration of an air-conditioning apparatus management apparatus 11 according to Embodiment 3 of the present invention.

FIG. 11 is a diagram showing an example of the functional configuration of the air-conditioning apparatus management apparatus 11 according to Embodiment 3 of the present invention. The difference from FIG. 2 is that an update state data storage area 44b is allocated to the logical space formed by the volatile memory 44. In the update state data storage area 44b, update state data is stored. The update state data is, for example, data regarding update software that has been transmitted so far, for example, an address on the logical space in which the data is stored. In addition, the update state data is various parameters being currently updated, for example, various contexts to be used in a transmission process for the transmission update software, that is, data regarding a state of the CPU at execution of an update process, for example, an address on the logical space in which such data is stored.

Figure 12:
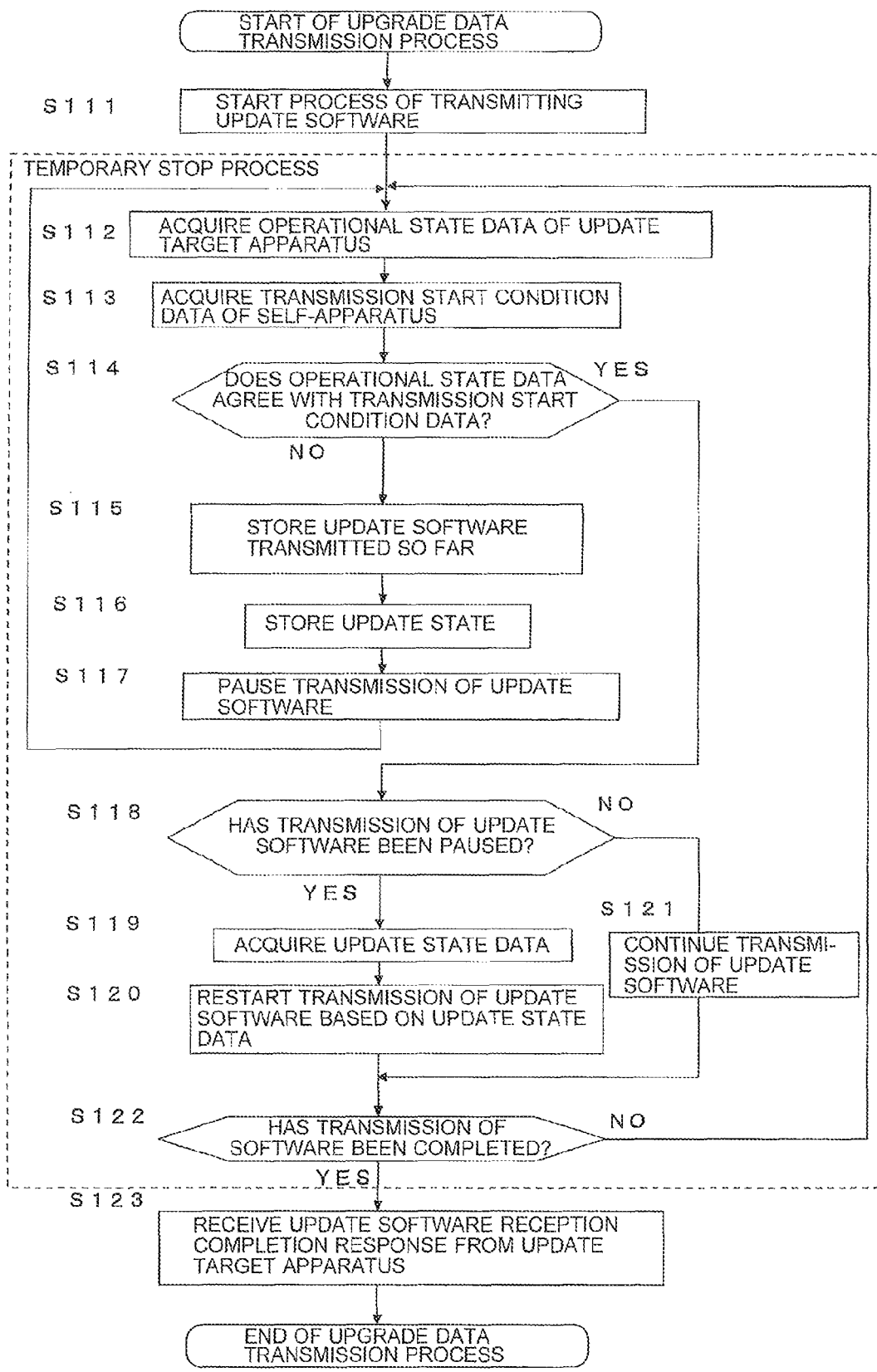
FIG. 12 is a flowchart illustrating an example of control of a data transmitting side air-conditioning apparatus management apparatus 11a according to Embodiment 3 of the present invention.

FIG. 12 is a flowchart illustrating an example of control of the data transmitting side air-conditioning apparatus management apparatus 11a according to Embodiment 3 of the present invention. A process obtained by adding a temporary stop process between the process in step S097 and the process in step S098 described with reference to FIG. 10 is a process described with reference to FIG. 12. The example of control described with reference to FIG. 12 is applicable to even the case where the update target apparatus 31 or 32 is the air-conditioning apparatus management apparatus 11b or the air-conditioning apparatus 17.

(Step S112)
The air-conditioning apparatus management apparatus 11a acquires the operational state data of the update target apparatus 31 or 32. Specifically, in the case where the update target apparatus 31 or 32 is the air-conditioning apparatus management apparatus 11b, the air-conditioning apparatus management apparatus 11a acquires the operational state data of the air-conditioning apparatus management apparatus 11b. In addition, in the case where the update target apparatus 31 or 32 is the air-conditioning apparatus 17, the air-conditioning apparatus management apparatus 11a acquires the operational state data of the air-conditioning apparatus 17.

(Step S113)
The air-conditioning apparatus management apparatus 11a acquires the transmission start condition data of the self-apparatus.

(Step S114)
The air-conditioning apparatus management apparatus 11a determines whether the operational state data agrees with the transmission start condition data. If the operational state data agrees with the transmission start condition data, the air-conditioning apparatus management apparatus 11a proceeds to step S118. On the other hand, if the operational state data does not agree with the transmission start condition data, the air-conditioning apparatus management apparatus 11a proceeds to step S115.

(Step S115)
The air-conditioning apparatus management apparatus 11a stores update software (for air-conditioning apparatus management or for air-conditioning apparatus) that has been transmitted so far. For example, in the case where the update target apparatus 31 or 32 is the air-conditioning apparatus management apparatus 11b, the transmission update software (for air-conditioning apparatus management) which is the update software (for air-conditioning apparatus management) that has been transmitted so far is stored into the reception update software storage area 43e provided in the update target apparatus 31. In addition, for example, in the case where the update target apparatus 31 or 32 is the air-conditioning apparatus 17, the transmission update software (for air-conditioning apparatus) which is the update software (for air-conditioning apparatus) that has been transmitted so far is stored into the reception update software storage area 53d provided in the update target apparatus 32.

(Step S116)
The air-conditioning apparatus management apparatus 11a stores an update state. Specifically, the air-conditioning apparatus management apparatus 11a stores the update state data into the update state data storage area 44b. The update state being stored and proceeding to another process correspond to so-called context switching being performed.

(Step S117)
The air-conditioning apparatus management apparatus 11a pauses transmission of the update software (for air-conditioning apparatus management or for air-conditioning apparatus). Specifically, the air-conditioning apparatus management apparatus 11a pauses an operation of transmitting the transmission update software (for air-conditioning apparatus management or for air-conditioning apparatus) to the update target apparatus 31 or 32, and returns to step S112.

(Step S118)
The air-conditioning apparatus management apparatus 11a determines whether the transmission of the update software (for air-conditioning apparatus management or for air-conditioning apparatus) has been paused. If the transmission of the update software (for air-conditioning apparatus management or for air-conditioning apparatus) has been paused, the air-conditioning apparatus management apparatus 11a proceeds to step S119. On the other hand, if the transmission of the update software has not been paused, the air-conditioning apparatus management apparatus 11a proceeds to step S121.

(Step S119)
The air-conditioning apparatus management apparatus 11a acquires the update state data. Specifically, the air-conditioning apparatus management apparatus 11a acquires the update state data stored in the process in Step S116, from the update state data storage area 44b.

(Step S120)
The air-conditioning apparatus management apparatus 11a restarts the transmission of the update software (for air-conditioning apparatus management or for air-conditioning apparatus) based on the update state data. Specifically, the air-conditioning apparatus management apparatus 11a reads the state of the CPU at the pause from the update state data, returns the execution environment to the state at the pause, and restarts the paused transmission of the transmission update software (for air-conditioning apparatus management or for air-conditioning apparatus).

(Step S121)

The air-conditioning apparatus management apparatus 11a continues the transmission of the update software (for air-conditioning apparatus management or for air-conditioning apparatus).

(Step S122)

The air-conditioning apparatus management apparatus 11a determines whether the transmission of the software (for air-conditioning apparatus management or for air-conditioning apparatus) has been completed. If the transmission of the software (for air-conditioning apparatus management or for air-conditioning apparatus) has been completed, the air-conditioning apparatus management apparatus 11a proceeds to step S123. On the other hand, if the transmission of the software (for air-conditioning apparatus management or for air-conditioning apparatus) has not been completed, the air-conditioning apparatus management apparatus 11a returns to step S112.

According to the above description, if the operational state of the update target apparatus 31 or 32 disagrees with the transmission start condition, the air-conditioning apparatus management apparatus 11a is able to pause transmission of the transmission update software (for air-conditioning apparatus management or for air-conditioning apparatus). If the operational state of the update target apparatus 31 or 32 agrees with the transmission start condition again, the air-conditioning apparatus management apparatus 11a is able to restart the transmission of the transmission update software (for air-conditioning apparatus management or for air-conditioning apparatus). Thus, the air-conditioning system 1 is able to finely divide and perform the update process in consideration with the operational state of the update target apparatus 31 or 32. Therefore, the air-conditioning system 1 is able to perform the update process on the assumption of a change in various environments assumed, and hence it is possible to provide a system having high practicability.

According to the above description, in Embodiment 3, if the software (for air-conditioning apparatus management) set in the some other air-conditioning apparatus management apparatus 11b is being updated and the operational state of the some other air-conditioning apparatus management apparatus 11b being currently updated disagrees with the transmission start condition, the some air-conditioning apparatus management apparatus 11a pauses update of the some other air-conditioning apparatus management apparatus 11b being currently updated. If the update of the software (for air-conditioning apparatus management) of the some other air-conditioning apparatus management apparatus 11b is being paused and the operational state of the other one air-conditioning apparatus management apparatus 11b being currently paused agrees with the transmission start condition, the some air-conditioning apparatus management apparatus 11a restarts the currently paused update of the some other air-conditioning apparatus management apparatus 11b. If the software (for air-conditioning apparatus) set in the air-conditioning apparatus 17 is being updated and the operational state of the air-conditioning apparatus 17 being currently updated disagrees with the transmission start condition, the air-conditioning apparatus management apparatus 11 pauses the update of the air-conditioning apparatus 17 being currently updated. If the update of the software (for air-conditioning apparatus) set in the air-conditioning apparatus 17 is being paused and the operational state of the air-conditioning apparatus 17 being currently paused agrees with the transmission start condition, the air-conditioning apparatus management apparatus 11 restarts the currently paused update of the air-conditioning apparatus 17.

Because of the above configuration, the air-conditioning system 1 is able to perform the update process on the assumption of a change in various environments assumed, and hence it is possible to provide a system having high practicability.

Embodiment 4

The difference from Embodiment 1 to Embodiment 3 is that a state at restart is notified the outside. For example, at restart of the update target apparatus 31 or 32, the update target apparatus 31 or 32 comes into a state where communication with another apparatus is temporarily not accepted. A process of notifying the outside of restart of the update target apparatus 31 or 32 at timing when the update target apparatus 31 or 32 restarts is an operation described in Embodiment 4.

For example, in the case where the update target apparatus 31 or 32 is the air-conditioning apparatus management apparatus 11b, an external device that transmits an operation command to the air-conditioning apparatus management apparatus 11b, for example, a remote controller is assumed to be connected thereto. In addition, in the case where the update target apparatus 31 or 32 is the air-conditioning apparatus 17, an external device that transmits an operation command to the air-conditioning apparatus 17, for example, a remote controller is assumed to be connected thereto. In either assumption, when restart of the update target apparatus 31 or 32 is being executed, the restart of the update target apparatus 31 or 32 is displayed on the external device, and when the restart of the update target apparatus 31 or 32 has been completed, the external device is caused to stop the display.

Figure 13:
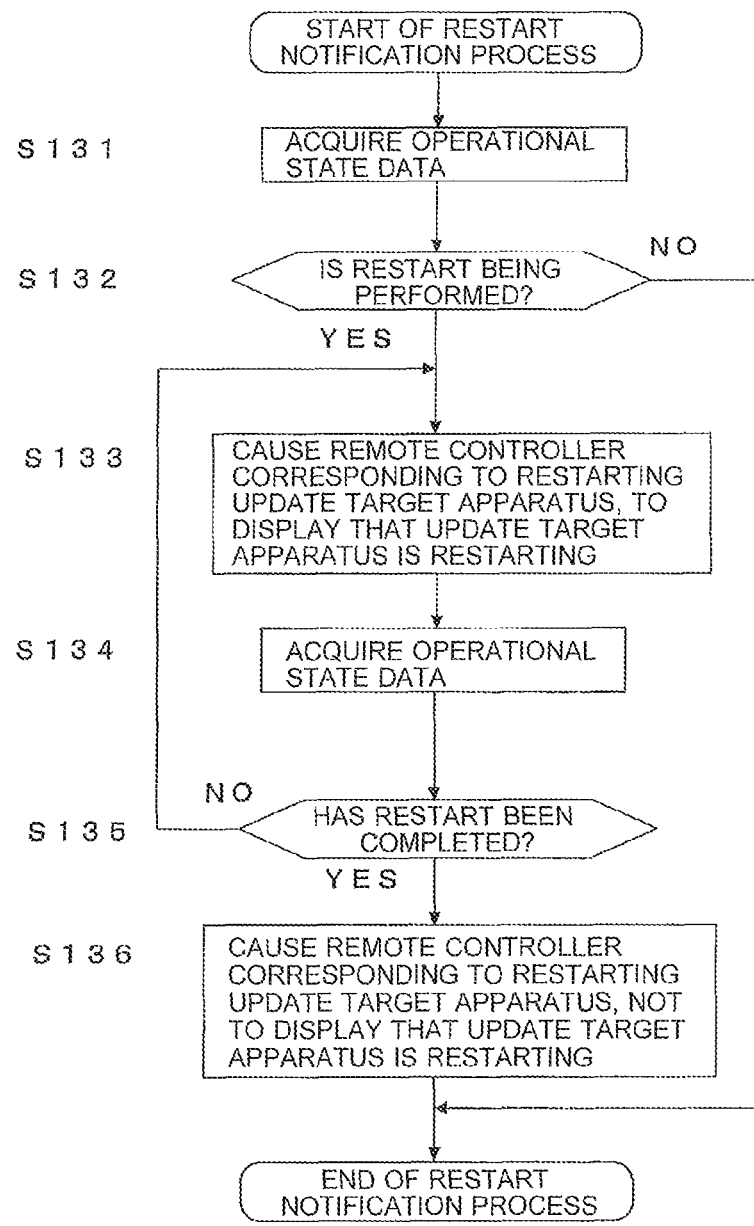
FIG. 13 is a flowchart illustrating an example of control of a data transmitting side air-conditioning apparatus management apparatus 11a according to Embodiment 4 of the present invention.

FIG. 13 is a flowchart illustrating an example of control of the data transmitting side air-conditioning apparatus management apparatus 11a according to Embodiment 4 of the present invention.

(Step S131)

The air-conditioning apparatus management apparatus 11a acquires the operational state data. Specifically, the air-conditioning apparatus management apparatus 11a acquires the operational state data of the update target apparatus 31 or 32.

(Step S132)

The air-conditioning apparatus management apparatus 11a determines whether restart is being performed. Specifically, the air-conditioning apparatus management apparatus 11a determines whether the update target apparatus 31 or 32 is restarting, based on the operational state data of the update target apparatus 31 or 32. If the update target apparatus 31 or 32 is restarting, the air-conditioning apparatus management apparatus 11a proceeds to step S133. On the other hand, if the update target apparatus 31 or 32 is not restarting, the air-conditioning apparatus management apparatus 11a ends the process.

(Step S133)

The air-conditioning apparatus management apparatus 11a causes the remote controller corresponding to the restarting update target apparatus 31 or 32, to display that the update target apparatus 31 or 32 is restarting.

(Step S134)

The air-conditioning apparatus management apparatus 11a acquires the operational state data. Specifically, the air-conditioning apparatus management apparatus 11a acquires the operational state data of the update target apparatus 31 or 32.

(Step S135)

The air-conditioning apparatus management apparatus 11a determines whether the restart has been completed. Specifically, the air-conditioning apparatus management apparatus 11a determines whether the restart of the update target apparatus 31 or 32 has been completed, based on the operational state data of the update target apparatus 31 or 32. If the restart of the update target apparatus 31 or 32 has been completed, the air-conditioning apparatus management apparatus 11a proceeds to step S135. On the other hand, if the restart of the update target apparatus 31 or 32 has not been completed, the air-conditioning apparatus management apparatus 11a returns to step S133.

(Step S136)

The air-conditioning apparatus management apparatus 11a causes the remote controller corresponding to the restarting update target apparatus 31 or 32, not to display that the update target apparatus 31 or 32 is restarting, and ends the process.

The display of being restarting is not particularly limited. For example, the display of being restarting may be performed by means of letters. Alternatively, the display of being restarting may be performed by means of a specific flashing signal. Still alternatively, the display of being restarting may be performed by means of a specific sign. Still alternatively, the display of being restarting may be performed by means of a specific figure. Still alternatively, the display of being restarting may be performed by means of specific animation.

It should be noted that the display of being restarting may not be performed, and it suffices to be possible to give notification of restarting. For example, notification of being restarting may be given by audio. Alternatively, in the case where a vibrator which transmits vibration to the remote controller is provided, notification of being restarting may be given by means of motion of the vibrator or the like. Still alternatively, notification of being restarting may be conveyed to another apparatus. For example, a message may be sent from the remote controller to a mobile phone terminal or the like possessed by the user, by means of e-mail. Still alternatively, notification of being restarting may be given by rumbling. In any case, it suffices to be possible to give notification of being restarting.

According to the above description, while the operation software (for air-conditioning apparatus management or for air-conditioning apparatus) of the update target apparatus 31 or 32 is being updated, it is possible to notify the user that the operation software is being updated. Thus, it is possible to notify the user of whether the update target apparatus 31 or 32 is restarting.

According to the above description, in Embodiment 4, the external device that transmits an operation command to the air-conditioning apparatus 17 is provided. If restart of the air-conditioning apparatus 17 is being executed, the air-conditioning apparatus management apparatus 11 causes the external device to display an execution state where the air-conditioning apparatus 17 is restarting. If the restart of the air-conditioning apparatus 17 has been completed, the air-conditioning apparatus management apparatus 11 causes the external device to stop displaying the execution state.

Because of the above configuration, it is possible to notify the user of whether the update target apparatus 31 or 32 is restarting.

REFERENCE SIGNS LIST 1 air-conditioning system 11, 11a, 11b, 11b_1 to 11b_N air-conditioning apparatus management apparatus 15, 15_1 to 15_N air-conditioning apparatus group 17, 17a to 17g air-conditioning apparatus 21 general transmission line 23 dedicated transmission line 31, 32 update target apparatus 41 first communication device 42 second communication device 43, 53 nonvolatile memory 43a, 53a operation software storage area 43b, 53b operational state data storage area 43c, 53c software version data storage area 43d transmission update software storage area 43e, 53d reception update software storage area 43f transmission destination data storage area 43g transmission start condition data storage area 43h restart condition data storage area 44, 54 volatile memory 44a operational state data storage area for update target apparatus 44b update state data storage area 51 third communication device

The invention claimed is:

1. An air-conditioning system comprising:
a first air-conditioning apparatus management apparatus, including a management communication device, a management processor, and a management memory; and
an first air-conditioning apparatus, including an air-conditioning communication device, an air-conditioning processor, and an air-conditioning memory, configured to transmit and receive various signals via the air-conditioning communication device to and from the first air-conditioning apparatus management apparatus, wherein
the first air-conditioning apparatus management apparatus manages the first air-conditioning apparatus,
an operational state of the first air-conditioning apparatus management apparatus is linked to an operational state of the first air-conditioning apparatus,
a first software set stored in the management memory is updated based on the operational state of the first air-conditioning apparatus management apparatus,
a plurality of air-conditioning apparatus management apparatuses, comparable to the first air-conditioning apparatus management apparatus, are provided and communicable with each other and with the first air-conditioning apparatus management apparatus, and
the first air-conditioning apparatus management apparatus updates a second software set in a second air-conditioning apparatus management apparatuses of the plurality of the air-conditioning apparatus management apparatus, based on an operational state of the second air-conditioning apparatus management apparatus, while continuing to manage the first air-conditioning apparatus,
when a version of the first software set in the first air-conditioning apparatus management apparatus is newer than a version of the second software set in the second air-conditioning apparatus management apparatus and an operational state of the first air-conditioning apparatus management apparatus meets a transmission start condition, the first air-conditioning apparatus management apparatus updates the second software set in the second air-conditioning apparatus management apparatus, wherein
the first air-conditioning apparatus management apparatus transmits the first software set in the first air-conditioning apparatus management apparatus, and restarts the second air-conditioning apparatus management apparatus, to update the second software set in the second air-conditioning apparatus management apparatus, and
the first air-conditioning apparatus management apparatus transmits the first software set in the first air-conditioning apparatus management apparatus, and restarts the first air-conditioning apparatus to update the first software set in the first air-conditioning apparatus.

2. The air-conditioning system of claim 1, wherein
a plurality of the air-conditioning apparatuses are provided, and
based on an operational state of a management target air-conditioning apparatus of the plurality of the air-conditioning apparatuses, the first air-conditioning apparatus management apparatus updates the first software set in the first management target air-conditioning apparatus.

3. The air-conditioning system of claim 1, wherein a predetermined transmission start condition is set,
when the operational state of the second air-conditioning apparatus management apparatus agrees with the transmission start condition, the first air-conditioning apparatus management apparatus determines that it is time to update the second software set in the second air-conditioning apparatus management apparatus, and
when the operational state of the first air-conditioning apparatus agrees with the transmission start condition, the first air-conditioning apparatus management apparatus determines that it is time to update the first software set in the first air-conditioning apparatus, and updates the first software set in the first air-conditioning apparatus.

4. The air-conditioning system of claim 3, wherein
when the second software set in the second air-conditioning apparatus management apparatus is being updated and the operational state of the second air-conditioning apparatus management apparatus being currently updated disagrees with the transmission start condition, the first air-conditioning apparatus management apparatus pauses the update of the second air-conditioning apparatus management apparatus being currently updated,
when the update of the second software set in the second air-conditioning apparatus management apparatus is being paused and the operational state of the second air-conditioning apparatus management apparatus being currently paused agrees with the transmission start condition, the first air-conditioning apparatus management apparatus restarts the update of the second air-conditioning apparatus management apparatus being currently paused,
when the first software set in the first air-conditioning apparatus is being updated and the operational state of the first air-conditioning apparatus being currently updated disagrees with the transmission start condition, the first air-conditioning apparatus management apparatus pauses the update of the first air-conditioning apparatus being currently updated, and
when the update of the first software set in the first air-conditioning apparatus is being paused and the operational state of the first air-conditioning apparatus being currently paused agrees with the transmission start condition, the first air-conditioning apparatus management apparatus restarts the update of the first air-conditioning apparatus being currently paused.

5. The air-conditioning system of claim 1, further comprising
an external device, different from the first air-conditioning apparatus management apparatus, configured to transmit an operation command to the first air-conditioning apparatus,
when restart of the first air-conditioning apparatus is being executed, the first air-conditioning apparatus management apparatus causes the external device to display an execution state where the restart of the first air-conditioning apparatus is being executed, and
when the restart of the first air-conditioning apparatus has been completed, the first air-conditioning apparatus management apparatus causes the external device to stop displaying the execution state.

6. The air-conditioning system of claim 1, wherein
when a version of the first software set in the first air-conditioning apparatus management apparatus is newer than a version of the first air-conditioning apparatus and the operational state of the first air-conditioning apparatus management apparatus agrees with the transmission start condition, the first air-conditioning apparatus management apparatus updates the first software set in the first air-conditioning apparatus.

7. The air-conditioning system of claim, wherein the second software set in the second air-conditioning apparatus management apparatus is updated with the first software set stored in the management memory of the first air-conditioning apparatus management apparatus.

* * * * *